(12) United States Patent
Wright et al.

(10) Patent No.: US 10,242,473 B2
(45) Date of Patent: Mar. 26, 2019

(54) COMPUTER SYSTEM TO GENERATE SCALABLE PLOTS USING CLUSTERING

(71) Applicant: SAS Institute Inc., Cary, NC (US)

(72) Inventors: Raymond Eugene Wright, Cary, NC (US); Ilknur Kaynar Kabul, Apex, NC (US); Susan Edwards Haller, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/927,654

(22) Filed: Mar. 21, 2018

(65) Prior Publication Data

US 2018/0286092 A1 Oct. 4, 2018

Related U.S. Application Data

(63) Continuation of application No. 15/927,610, filed on Mar. 21, 2018, now Pat. No. 10,127,696.

(60) Provisional application No. 62/474,752, filed on Mar. 22, 2017.

(51) Int. Cl.
| | |
|---|---|
| *G06F 15/18* | (2006.01) |
| *G06T 11/20* | (2006.01) |
| *G06F 17/30* | (2006.01) |
| *G06F 3/0484* | (2013.01) |
| *G06F 17/18* | (2006.01) |
| *G06K 9/00* | (2006.01) |

(52) U.S. Cl.
CPC ........ *G06T 11/206* (2013.01); *G06F 3/04845* (2013.01); *G06F 17/18* (2013.01); *G06F 17/30572* (2013.01); *G06F 17/30575* (2013.01); *G06F 17/30598* (2013.01); *G06K 9/00* (2013.01); *G06F 2203/04806* (2013.01); *G06T 2200/24* (2013.01)

(58) Field of Classification Search
CPC .................................................... G06N 5/02
USPC ........................................... 706/15, 45
See application file for complete search history.

(56) References Cited

U.S. PATENT DOCUMENTS

| | | | | |
|---|---|---|---|---|
| 2017/0017903 | A1* | 1/2017 | Gray | G06N 99/005 |
| 2018/0060738 | A1* | 3/2018 | Achin | G06N 5/022 |

* cited by examiner

*Primary Examiner* — David R Vincent

(57) ABSTRACT

One or more embodiments may include techniques to computer generate one or more plots based on computational clustering performed by a system. Embodiments include performing clustering on a dataset to generate a number of clusters of data for the dataset. The clusters may be processed and used to generate the one or more plots. In some embodiments, the plots may include one or more variables plotted against a weighted average score associated with a cluster, the plot may visually indicate the effect that the one or more variables has on the predicted outcome. The one or more plots may be presented in a display on a display device. In some embodiments, the plots may be segmented and each segment may correspond with a number of individual curves. The segmented curves may be plotted and displayed on the display device.

27 Claims, 33 Drawing Sheets

```
500 ↘
```

RECEIVE GRID STATUS INFORMATION INCLUDING A PROJECT STATUS OF A PORTION OF A PROJECT BEING EXECUTED BY A NODE IN THE COMMUNICATIONS GRID

502

↓

STORE THE GRID STATUS INFORMATION

504

↓

RECEIVE A FAILURE COMMUNICATION CORRESPONDING TO A NODE IN THE COMMUNICATIONS GRID

506

↓

REASSIGN A NODE OR A PORTION OF THE PROJECT BEING EXECUTED BY THE FAILED NODE

508

↓

RECEIVE UPDATED GRID STATUS INFORMATION BASED ON THE REASSIGNMENT

510

↓

TRANSMIT A SET OF INSTRUCTIONS BASED ON THE UPDATED GRID STATUS INFORMATION TO ONE OR MORE NODES IN THE COMMUNICATIONS GRID

```
IDENTIFY A DATASET AND A MODEL TO GENERATE INDIVIDUAL
CONDITIONAL EXPECTATION (ICE) PLOTS, THE DATASET COMPRISING
OBSERVATIONS AND THE ICE PLOTS TO VISUALLY INDICATE AN
EFFECT THAT A VARIABLE HAS ON A PREDICTED OUTCOME
2305
```

```
IDENTIFY A RANGE OF VALUES FOR THE VARIABLE TO COMPUTE
INDIVIDUAL CURVES FOR THE OBSERVATIONS
2310
```

```
COMPUTE INDIVIDUAL CURVES FOR THE OBSERVATIONS OF THE
DATASET, WHEREIN AN INDIVIDUAL CURVE IS COMPUTED FOR EACH
OBSERVATION BY VARYING THE VARIABLE OVER THE RANGE OF
VALUES FOR THE OBSERVATION USING THE MODEL
2315
```

```
PERFORM SEGMENTING OF THE INDIVIDUAL CURVES TO GENERATE A
NUMBER OF CLUSTERS OF CURVES, EACH CLUSTER OF CURVES
COMPRISING A SUBSET OF THE INDIVIDUAL CURVES AND EACH OF
THE SUBSETS OF THE INDIVIDUAL CURVES REPRESENTED BY A
RESPECTIVE PROXY CURVE
2320
```

```
PLOT EACH OF THE PROXY CURVES TO VISUALLY INDICATE THE
EFFECT THE VARIABLE HAS ON THE PREDICTED OUTCOME
2325
```

```
PRESENT THE ICE PLOTS OF THE PROXY CURVES IN A DISPLAY ON A
DISPLAY DEVICE
2330
```

FIG. 23

COMPUTER SYSTEM TO GENERATE SCALABLE PLOTS USING CLUSTERING

RELATED APPLICATION

This application is a continuation of, claims the benefit of and priority to previously filed U.S. patent application Ser. No. 15/927,610 filed Mar. 21, 2018, entitled "A Computer System to Generate Scalable Plots Using Clustering Related Application", which claims the benefit of priority of 35 U.S.C. § 119(e) to U.S. Provisional Patent Application Ser. No. 62/474,752, filed on Mar. 22, 2017, which are incorporated by reference.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

Various embodiments described herein may include an apparatus comprising processing circuitry, and memory to store instructions that, when executed by the processing circuitry, cause the processing circuitry to determine a dataset and a model to generate one or more partial dependence (PD) plots, each of the one or more PD plots to visually indicate an effect that corresponding one or more variables has on a predicted outcome, perform clustering on the dataset to generate a number of clusters of data for the dataset, each cluster of data comprising a cluster center value, each of the cluster center values to represent data in a corresponding cluster, generate a reduced dataset including each of the cluster center values representing data in the corresponding cluster, replicate each of the cluster center values of the reduced dataset for each of the one or more variables, wherein a number of replications of the cluster center values is based on a number of unique values of the one or more variables to plot, score each of the clusters using the cluster center values and the model to generate a score for each of the cluster, generate average scores for the clusters by averaging the scores across the clusters, generate weighted average scores by weighting the average scores with cluster frequencies for the clusters, generate the one or more PD plots each corresponding with a variable of the one or more variables plotted against one of the weighted average scores by applying the model to the reduced dataset to visually indicate the effect that the one or more variables has on the predicted outcome, and present the one or more PD plots in a display on a display device.

In embodiments, the display comprises a graphical user interface (GUI) and the of one or more PD plots are presented in one of a one-dimension (1D) PD plot display and a two-dimension (2D) PD plot display.

Embodiments also include performing clustering on the dataset is k-prototype clustering, where k is the number of clusters, and the processing circuitry to determine the number of clusters by one of an Aligned Box Criterion (ABC) method and a user provided value.

In embodiments, the processing circuitry to associate data of the dataset to a cluster having a nearest cluster center value, the nearest cluster center value to provide a proxy representation for the data.

In embodiments, each cluster center value is a central vector of a cluster, and at least one of the cluster center values equals a data point of data in a particular cluster, or at least one of the cluster center values does not equal a data point of data in a particular cluster.

In some embodiments, the processing circuitry to detect an input, the input to cause processing of a macro code, the macro code comprising one or more of an indication of the dataset, an indication of the one or variables to plot, an indication of model score code for the model, an indication of the predicted outcome, an indication of the number of clusters, an indication of a type of clustering, and an indication of a type of plot, and initiate generation of the one or more PD plots based on the detected input.

In embodiments, the processing circuitry to process a macro code to generate the one or more PD plots, the macro code comprising an indication of the dataset and an indication of a model score code for the model, determine the dataset based on the indication of the datasets, determine the model and score code based on the indication of the model score code for the model, and score each of the clusters utilizing the score code.

Some embodiments include processing circuitry to process a macro code to generate the one or more PD plots, the macro code comprising an indication of a type of clustering to perform on the data set, and perform the clustering on the dataset to generate the clusters based on the indication of the type of clustering to perform indicated in the macro code.

Embodiments include processing circuitry to process a macro code to generate the one or more PD plots, the macro code comprising an indication of one or more variables to plot, determine the unique values for the one or more variables to plot based on the indication of the one or more variables, and replicate each of the cluster center values of the reduced dataset based on a number of unique values.

In embodiments, an apparatus may include an input device coupled with the memory and the processing circuitry. The apparatus may also include the display device coupled with the input device, the memory, and the processing circuitry, the display device to present the one or more PD plots, and the input device to receive one or more inputs to manipulate at least one of the one or more PD plots, and the processing circuitry to perform a manipulation including one or more of zooming in a section of a plot, zooming out on a section of a plot, rotating one or more plots, highlighting a plot, drawing on a plot, and selecting a plot.

Embodiments also include a computer-implemented method including determining a dataset and a model to generate one or more partial dependence (PD) plots, each of the one or more PD plots to visually indicate an effect that corresponding one or more variables has on a predicted outcome, performing clustering on the dataset to generate a number of clusters of data for the dataset, each cluster of data comprising a cluster center value, each of the cluster center values to represent data in a corresponding cluster, generating a reduced dataset including each of the cluster center values representing data in the corresponding cluster, replicating each of the cluster center values of the reduced dataset for each of the one or more variables, wherein a number of replications of the cluster center values is based on a number of unique values of the one or more variables to plot, scoring each of the clusters using the cluster center values and the model to generate a score for each of the clusters, generating average scores for the clusters by averaging the scores across the clusters, generating weighted average scores by weighting the average scores with cluster frequencies for the clusters, generating the one or more PD plots each corresponding with a variable of the one or more variables plotted against one of the weighted average scores by applying the model to the reduced dataset to visually indicate the effect that the one or more variables has on the predicted outcome, and presenting the one or more PD plots in a display on a display device.

In embodiments, the display includes a graphical user interface (GUI) and the of one or more PD plots are presented in one of a one-dimension (1D) PD plot display and a two-dimension (2D) PD plot display.

In embodiments, the clustering performed on the dataset is k-prototype clustering, where k is the number of clusters, and determining the number of clusters by one of an Aligned Box Criterion (ABC) method and a user provided value.

In embodiments, the computer-implemented method includes associating data of the dataset to a cluster having a nearest cluster center value, the nearest cluster center value to provide a proxy representation for the data.

In embodiments, each cluster center value is a central vector of a cluster, and at least one of the cluster center values equals a data point of data in a particular cluster, or at least one of the cluster center values does not equal a data point of data in a particular cluster.

In embodiments, the computer-implemented method includes detecting an input, the input to cause processing of a macro code, the macro code comprising one or more of an indication of the dataset, an indication of the one or variables to plot, an indication of model score code for the model, an indication of the predicted outcome, an indication of the number of clusters, an indication of a type of clustering, and an indication of a type of plot, and initiating generation of the one or more PD plots based on the detected input.

Embodiments include processing a macro code to generate the one or more PD plots, the macro code comprising an indication of the dataset and an indication of a model score code for the model, determining the dataset based on the indication of the dataset, determining the model and score code based on the indication of the model score code for the model, and scoring each of the clusters utilizing the score code.

In embodiments, a computer-implemented method includes processing a macro code to generate the one or more PD plots, the macro code comprising an indication of a type of clustering to perform on the data set, and performing the clustering on the dataset to generate the clusters based on the indication of the type of clustering to perform indicated in the macro code.

Embodiments include processing a macro code to generate the one or more PD plots, the macro code comprising an indication of one or more variables to plot, determining the unique values for the one or more variables to plot based on the indication of the one or more variables, and replicating each of the cluster center values of the reduced dataset based on a number of unique values.

In embodiments, a computer-implemented method includes receiving, by an input device, one or more inputs to manipulate at least one of the one or more PD plots, and in response to receive the one or more inputs, performing a manipulation including one or more of zooming in a section of a plot, zooming out on a section of a plot, rotating one or more plots, highlighting a plot, drawing on a plot, and selecting a plot.

In embodiments, at least one non-transitory computer-readable storage medium comprising instructions that when executed cause processing circuitry to determine a dataset and a model to generate one or more partial dependence (PD) plots, each of the one or more PD plots to visually indicate an effect that corresponding one or more variables has on a predicted outcome, perform clustering on the dataset to generate a number of clusters of data for the dataset, each cluster of data comprising a cluster center value, each of the cluster center values to represent data in a corresponding cluster, generate a reduced dataset including each of the cluster center values representing data in the corresponding cluster, replicate each of the cluster center values of the reduced dataset for each of the one or more variables, wherein a number of replications of the cluster center values is based on a number of unique values of the one or more variables to plot, score each of the clusters using the cluster center values and the model to generate a score for each of the clusters, generate average scores for the clusters by averaging the scores across the clusters, generate weighted average scores by weighting the average scores with cluster frequencies for the clusters, generate the one or more PD plots each corresponding with a variable of the one or more variables plotted against one of the weighted average scores by applying the model to the reduced dataset to visually indicate the effect that the one or more variables has on the predicted outcome, and present the one or more PD plots in a display on a display device.

In embodiments, the non-transitory computer-readable storage medium, wherein the display comprises a graphical user interface (GUI) and the of one or more PD plots are presented in one of a one-dimension (1D) PD plot display and a two-dimension (2D) PD plot display.

In embodiments, the clustering performed on the dataset is k-prototype clustering, where k is the number of clusters, and the processing circuitry to determine the number of clusters by one of an Aligned Box Criterion (ABC) method and a user provided value.

In embodiments, the non-transitory computer-readable storage medium comprising instructions that when executed cause the processing circuitry to associate data of the dataset to a cluster having a nearest cluster center value, the nearest cluster center value to provide a proxy representation for the data.

In embodiments, each cluster center value is a central vector of a cluster, and at least one of the cluster center values equals a data point of data in a particular cluster, or at least one of the cluster center values does not equal a data point of data in a particular cluster.

In embodiments, the non-transitory computer-readable storage medium comprising instructions that when executed cause the processing circuitry to detect, via an input device, an input to cause processing of a macro code, the macro code comprising one or more of an indication of the dataset, an indication of the one or variables to plot, an indication of model score code for the model, an indication of the predicted outcome, an indication of the number of clusters, an indication of a type of clustering, and an indication of a type of plot, and initiate generation of the one or more PD plots based on the detected input.

Embodiments also include the non-transitory computer-readable storage medium comprising instructions that when executed cause the processing circuitry to process a macro code to generate the one or more PD plots, the macro code comprising an indication of the dataset and an indication of a model score code for the model, determine the dataset based on the indication of the dataset, determine the model and score code based on the indication of the model score code for the model, and score each of the clusters utilizing the score code.

Embodiments include the non-transitory computer-readable storage medium comprising instructions that when executed cause the processing circuitry to process a macro code to generate the one or more PD plots, the macro code comprising an indication of a type of clustering to perform on the data set, and perform the clustering on the dataset to generate the clusters based on the indication of the type of clustering to perform indicated in the macro code.

In embodiments the non-transitory computer-readable storage medium comprising instructions that when executed cause the processing circuitry to process a macro code to generate the one or more PD plots, the macro code comprising an indication of one or more variables to plot, determine the unique values for the one or more variables to plot based on the indication of the one or more variables, and replicate each of the cluster center values of the reduced dataset based on a number of unique values.

In embodiments, the non-transitory computer-readable storage medium, comprising instructions that when executed cause the processing circuitry to receive, via an input device, one or more inputs to manipulate at least one of the one or more PD plots, the processing circuitry to perform a manipulation including one or more of zooming in a section of a plot, zooming out on a section of a plot, rotating one or more plots, highlighting a plot, drawing on a plot, and selecting a plot.

Various embodiments described herein may also include an apparatus comprising processing circuitry, and memory to store instructions that, when executed by the processing circuitry, cause the processing circuitry to identify a dataset and a model to generate Individual Conditional Expectation (ICE) plots, the dataset comprising observations and the ICE plots to visually indicate an effect that a variable has on a predicted outcome, identify a range of values for the variable to compute individual curves for the observations, compute individual curves for the observations of the dataset, wherein an individual curve is computed for each observation by varying the variable over the range of values for the observation using the model, perform segmenting of the individual curves to generate a number of clusters of curves, each cluster of curves comprising a subset of the individual curves and each of the subsets of the individual curves represented by a respective proxy curve, plot each of the proxy curves to visually indicate the effect the variable has on the predicted outcome, and present the ICE plots of the proxy curves in a display on a display device.

Embodiments include processing circuitry perform k-prototype clustering to cluster the curves, and determine cluster center curves for the clusters of curves, wherein each cluster center curve is the respective proxy curve for one of the cluster of curves.

In embodiments, the display comprises a graphical user interface (GUI) and the ICE plots presented in the GUI, and wherein each respective proxy curve is selectable to drill down on a subset of individual curves within the cluster of curves via an interaction with the GUI.

Embodiments include the processing circuitry to receive an indication of a selection of one of the respective proxy curves, the selection made via a user input device determine a subset of individual curves associated with the selected proxy curve, plot each curve of the subset of the individual curves associated with the selected proxy curve, and present the plots of the curves in the display on the display device.

In embodiments, the processing circuitry to detect an input, the input to initialize processing of macro code to generate the proxy curves to plot, the macro code to provide one or more of an indication of the dataset, an indication of the variable, an indication of a range of values for the variable, an indication of model score code for the model, an indication of the predicted outcome, an indication of a maximum number of cluster of curves, and an indication whether to sample or cluster observations of the dataset.

Embodiments include the processing circuitry to determine a potential number of clusters of curves to generate using an Aligned Box Criterion (ABC) method, determine a maximum number of cluster of curves specified in macro code, and generate whichever is lesser, the potential number of clusters of curves or the maximum number of cluster of curves.

In embodiments, the processing circuitry to determine whether to perform sampling or clustering on the dataset prior to computing the individual curves based on a setting in macro code.

In embodiments, the processing circuitry to perform sampling on the dataset to a reduced dataset comprising a random sample of the observations, and wherein the reduced dataset is used to compute the individual curves.

Embodiments include the processing circuitry to perform clustering on the dataset to generate a number of clusters of observations for the dataset, each cluster of observations comprising a cluster center value, each of the cluster center values to represent observations in a corresponding cluster and generate a reduced dataset including each of the cluster center values representing observations in the corresponding cluster, the reduced data set used to compute the individual curves.

In embodiments, the apparatus includes an input device coupled with the memory and the processing circuitry, the display device coupled with the input device, the memory, and the processing circuitry, the display device operable to present the plots, and the processing circuitry to receive, by an input device, one or more inputs to manipulate at least one of the one or more ICE plots, and in response to receive the one or more inputs, performing a manipulation including one or more of zooming in a section of a plot, zooming out on a section of a plot, rotating one or more plots, highlighting a plot, drawing on a plot, and selecting a plot.

Various embodiments include a computer-implemented method, comprising identifying a dataset and a model to generate Individual Conditional Expectation (ICE) plots, the dataset comprising observations and the ICE plots to visually indicate an effect that a variable has on a predicted outcome, identifying a range of values for the variable to compute individual curves for the observations, computing individual curves for the observations of the dataset, wherein an individual curve is computed for each observation by varying the variable over the range of values for the observation using the model, performing segmenting of the individual curves to generate a number of clusters of curves, each cluster of curves comprising a subset of the individual curves and each of the subsets of the individual curves represented by a respective proxy curve, plotting each of the proxy curves to visually indicate the effect the variable has on the predicted outcome, and presenting the ICE plots of the proxy curves in a display on a display device.

Embodiments include the computer-implemented method including performing k-prototype clustering to cluster the curves, and determining cluster center curves for the clusters of curves, wherein each cluster center curve is the respective proxy curve for one of the cluster of curves.

In embodiments the display comprises a graphical user interface (GUI) and the ICE plots presented in the GUI, and wherein each respective proxy curve is selectable to drill down on a subset of individual curves within the cluster of curves via an interaction with the GUI.

Embodiments include the computer-implemented method including receiving an indication of a selection of one of the respective proxy curves, the selection made via a user input device, determining a subset of individual curves associated with the selected proxy curve, plotting each curve of the subset of the individual curves associated with the selected proxy curve, and presenting the plots of the curves in the display on the display device.

Embodiments include the computer-implemented method including detecting an input, the input to initialize processing of macro code to generate the proxy curves to plot, the macro code to provide one or more of an indication of the dataset, an indication of the variable, an indication of a range of values for the variable, an indication of model score code for the model, an indication of the predicted outcome, an indication of a maximum number of cluster of curves, and an indication whether to sample or cluster observations of the dataset.

Embodiments include the computer-implemented method include determining a potential number of clusters of curves to generate using an Aligned Box Criterion (ABC) method, determining a maximum number of cluster of curves specified in macro code, and generating whichever is lesser, the potential number of clusters of curves or the maximum number of cluster of curves.

Embodiments include the computer-implemented method including determining whether to perform sampling or clustering on the dataset prior to computing the individual curves based on a setting in macro code.

In embodiments, the computer-implemented method including performing sampling on the dataset to a reduced dataset comprising a random sample of the observations, and wherein the reduced dataset is used to compute the individual curves.

In embodiments, the computer-implemented method including performing clustering on the dataset to generate a number of clusters of observations for the dataset, each cluster of observations comprising a cluster center value, each of the cluster center values to represent observations in a corresponding cluster, and generating a reduced dataset including each of the cluster center values representing observations in the corresponding cluster, the reduced data set used to compute the individual curves.

In embodiments, the computer-implemented method including receiving, by an input device, one or more inputs to manipulate at least one of the one or more ICE plots, and in response to receive the one or more inputs performing a manipulation including one or more of zooming in a section of a plot, zooming out on a section of a plot, rotating one or more plots, highlighting a plot, drawing on a plot, and selecting a plot.

Embodiments including at least one non-transitory computer-readable storage medium comprising instructions that when executed cause processing circuitry to identify a dataset and a model to generate Individual Conditional Expectation (ICE) plots, the dataset comprising observations and the ICE plots to visually indicate an effect that a variable has on a predicted outcome, identify a range of values for the variable to compute individual curves for the observations, compute individual curves for the observations of the dataset, wherein an individual curve is computed for each observation by varying the variable over the range of values for the observation using the model, perform segmenting of the individual curves to generate a number of clusters of curves, each cluster of curves comprising a subset of the individual curves and each of the subsets of the individual curves represented by a respective proxy curve, plot each of the proxy curves to visually indicate the effect the variable has on the predicted outcome, and present the ICE plots of the proxy curves in a display on a display device.

Embodiments including one non-transitory computer-readable storage medium comprising instructions that when executed cause processing circuitry to perform k-prototype clustering to cluster the curves, and determine cluster center curves for the clusters of curves, wherein each cluster center curve is the respective proxy curve for one of the cluster of curves.

Embodiments including one non-transitory computer-readable storage medium comprising instructions that when executed cause processing circuitry to, wherein the display comprises a graphical user interface (GUI) and the ICE plots presented in the GUI, and wherein each respective proxy curve is selectable to drill down on a subset of individual curves within the cluster of curves via an interaction with the GUI.

Embodiments including one non-transitory computer-readable storage medium comprising instructions that when executed cause processing circuitry to receive an indication of a selection of one of the respective proxy curves, the selection made via a user input device, determine a subset of individual curves associated with the selected proxy curve, plot each curve of the subset of the individual curves associated with the selected proxy curve, and present the plots of the curves in the display on the display device.

Embodiments including one non-transitory computer-readable storage medium comprising instructions that when executed cause processing circuitry to detect an input, the input to initialize processing of macro code to generate the proxy curves to plot, the macro code to provide one or more of an indication of the dataset, an indication of the variable, an indication of a range of values for the variable, an indication of model score code for the model, an indication of the predicted outcome, an indication of a maximum number of cluster of curves, and an indication whether to sample or cluster observations of the dataset.

Embodiments including one non-transitory computer-readable storage medium comprising instructions that when executed cause processing circuitry to determine a potential number of clusters of curves to generate using an Aligned Box Criterion (ABC) method, determine a maximum number of cluster of curves specified in macro code, and generate whichever is lesser, the potential number of clusters of curves or the maximum number of cluster of curves.

Embodiments including one non-transitory computer-readable storage medium comprising instructions that when executed cause processing circuitry to determine whether to perform sampling or clustering on the dataset prior to computing the individual curves based on a setting in macro code.

Embodiments including one non-transitory computer-readable storage medium comprising instructions that when executed cause processing circuitry to perform sampling on the dataset to a reduced dataset comprising a random sample of the observations, and wherein the reduced dataset is used to compute the individual curves.

Embodiments including one non-transitory computer-readable storage medium comprising instructions that when executed cause processing circuitry to perform clustering on the dataset to generate a number of clusters of observations for the dataset, each cluster of observations comprising a cluster center value, each of the cluster center values to represent observations in a corresponding cluster, and generate a reduced dataset including each of the cluster center values representing observations in the corresponding cluster, the reduced data set used to compute the individual curves.

Embodiments including one non-transitory computer-readable storage medium comprising instructions that when executed cause processing circuitry to At least one non-transitory computer-readable storage medium comprising instructions that when executed cause processing circuitry to receive, by an input device, one or more inputs to manipulate at least one of the one or more ICE plots, and in response to receiving the one or more inputs, perform a manipulation including one or more of zooming in a section of a plot, zooming out on a section of a plot, rotating one or more plots, highlighting a plot, drawing on a plot, and selecting a plot.

BRIEF DESCRIPTION OF THE DRAWINGS

Embodiments of this disclosure are illustrated by way of example and not by way of limitation, in the figures of the accompanying drawings in which like reference numerals refer to similar elements.

FIG. 5 illustrates a flow chart showing an example process for adjusting a communications grid or a work project in a communications grid after a failure of a node, according to some embodiments of the present technology.

FIG. 23 illustrates an example of another logic flow.

DETAILED DESCRIPTION

Figure 1:
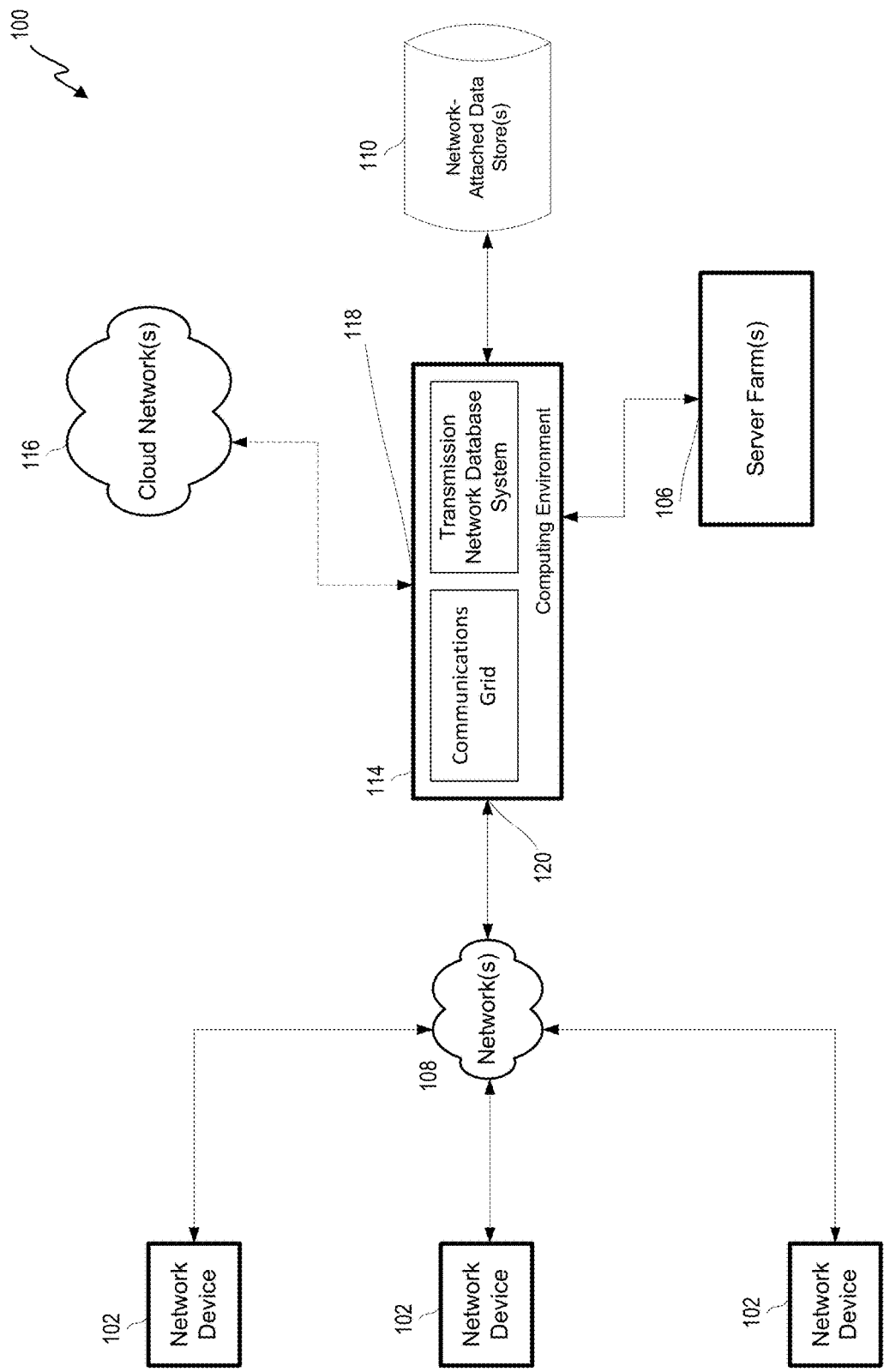
FIG. 1 illustrates a block diagram that illustrates the hardware components of a computing system, according to some embodiments of the present technology.

The proposed techniques discussed herein can circumvent the problem of needing excessive compute time requirements in processing large datasets and to generate one or more plots utilizing the dataset. Moreover, embodiments include techniques to enable plots, such as partial dependence (PD) and individual conditional expectation (ICE) plots, to scale with large datasets and present the plots in a visually useful manner using scalable high-fidelity approximations of the plots. Systems depicted in some of the figures may be provided in various configurations. In some embodiments, the systems may be configured as a distributed system where one or more components of the system are distributed across one or more networks in a cloud computing system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
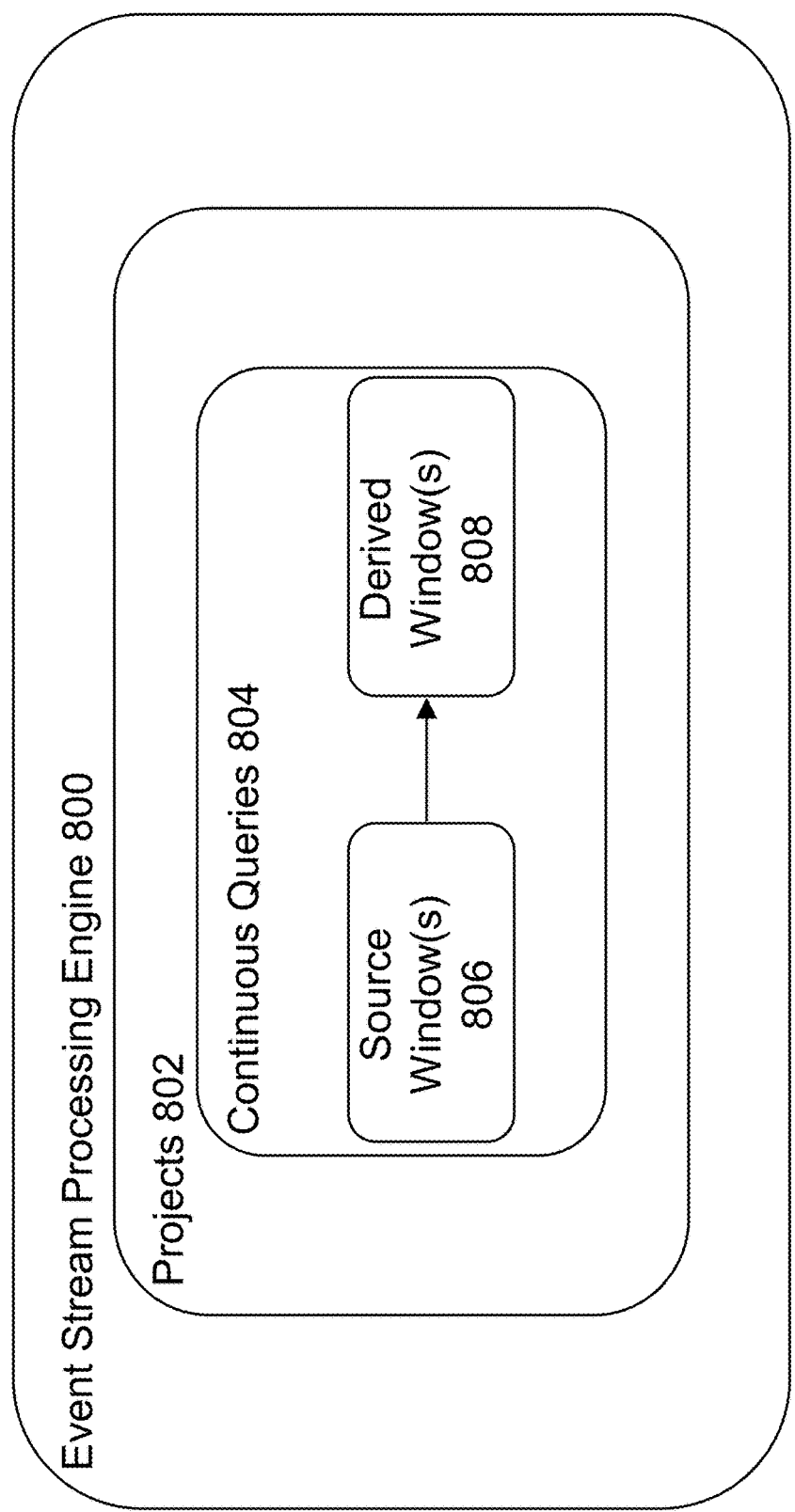
FIG. 8 illustrates a block diagram including components of an Event Stream Processing Engine (ESPE), according to embodiments of the present technology.
Figure 9:
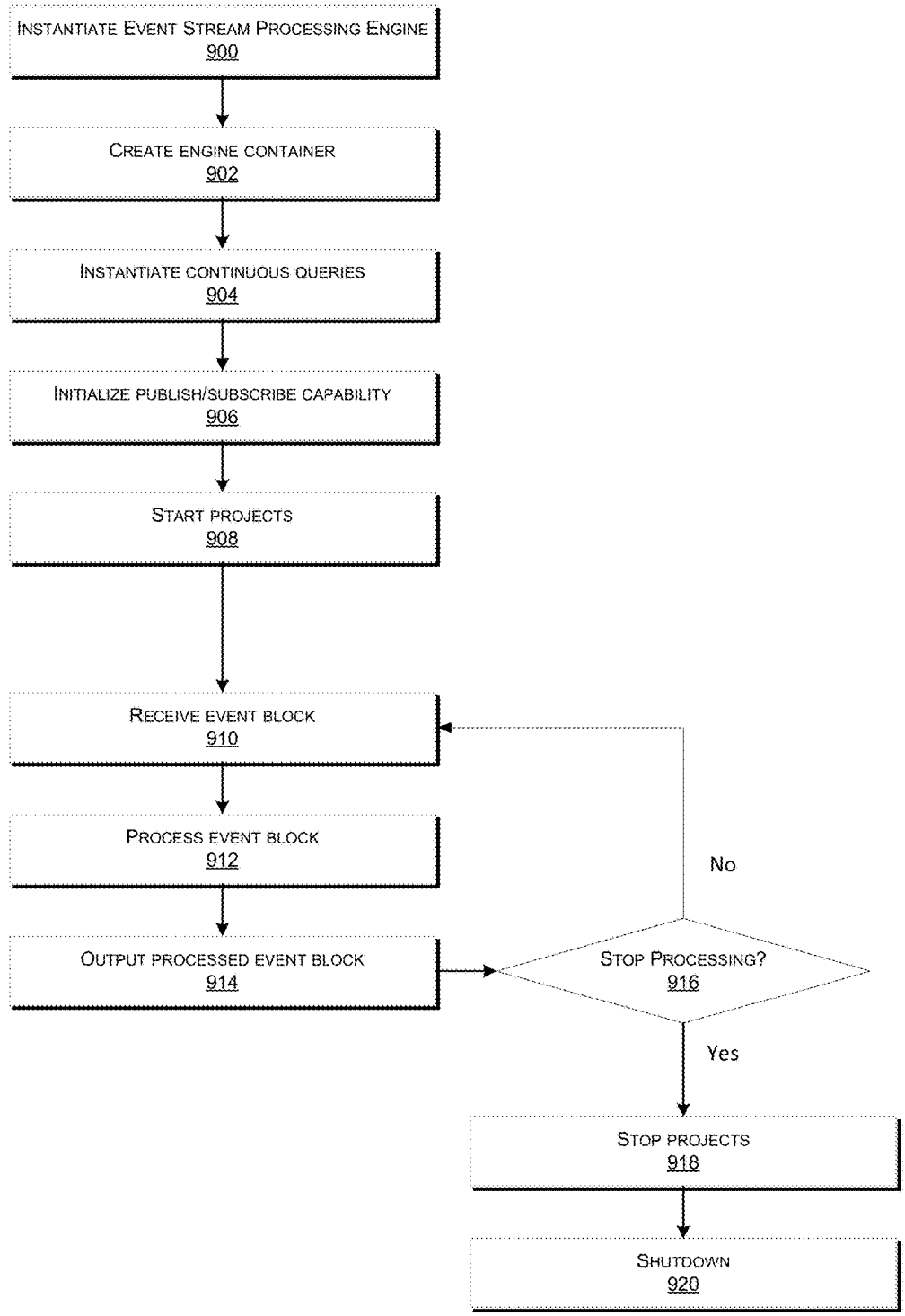
FIG. 9 illustrates a flow chart showing an example process including operations performed by an event stream processing engine, according to some embodiments of the present technology.
Figure 10:
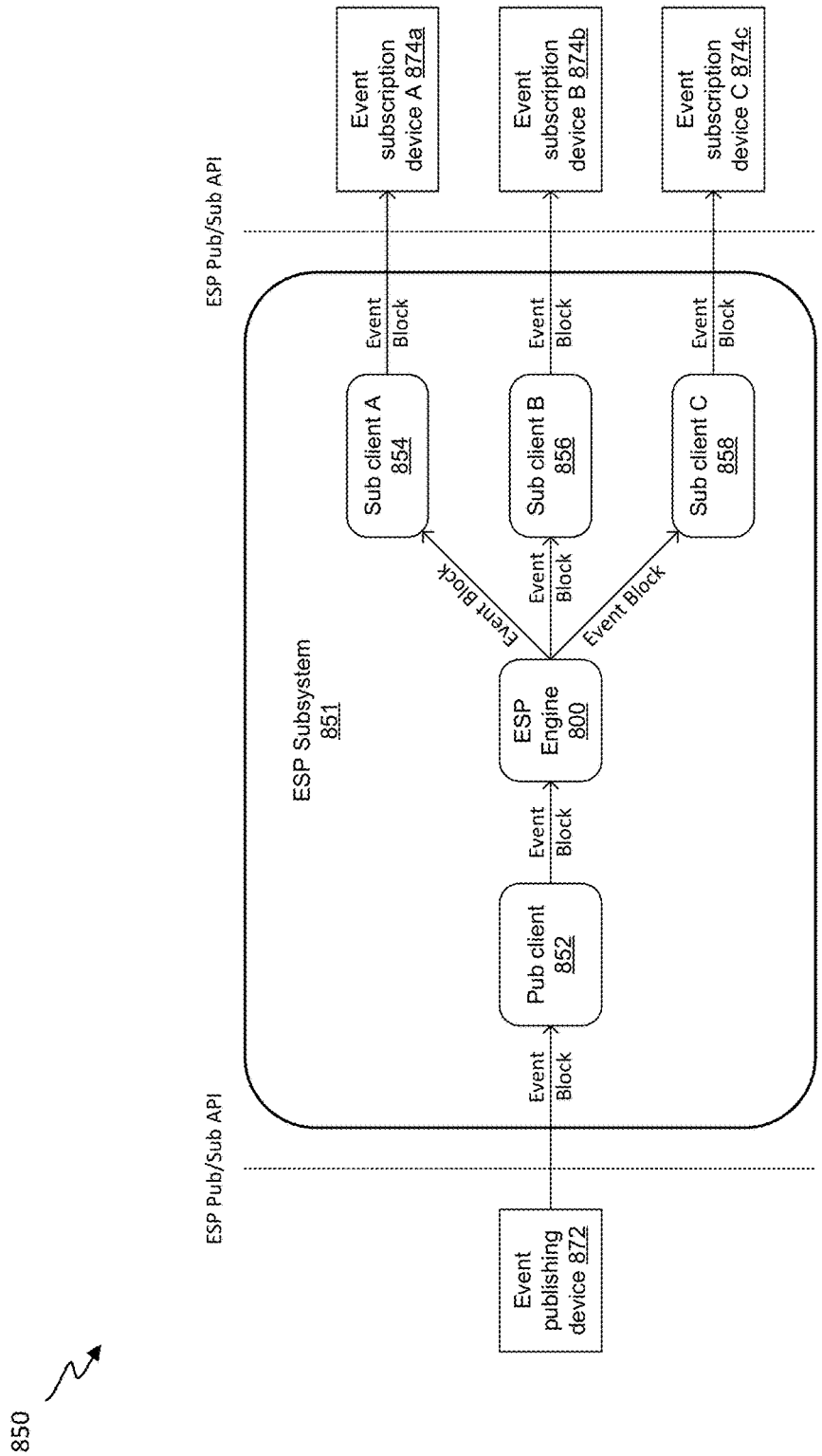
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
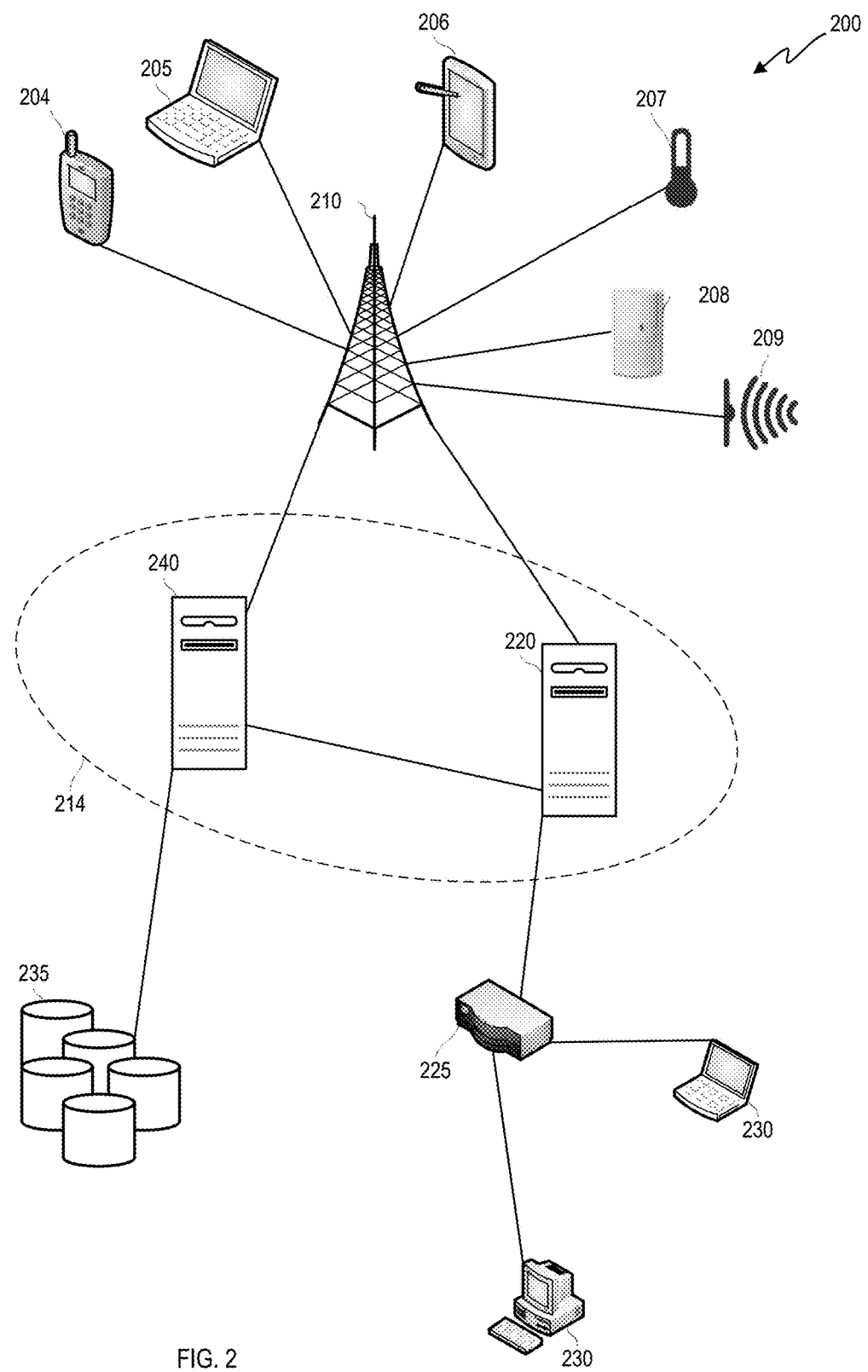
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240, such as a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
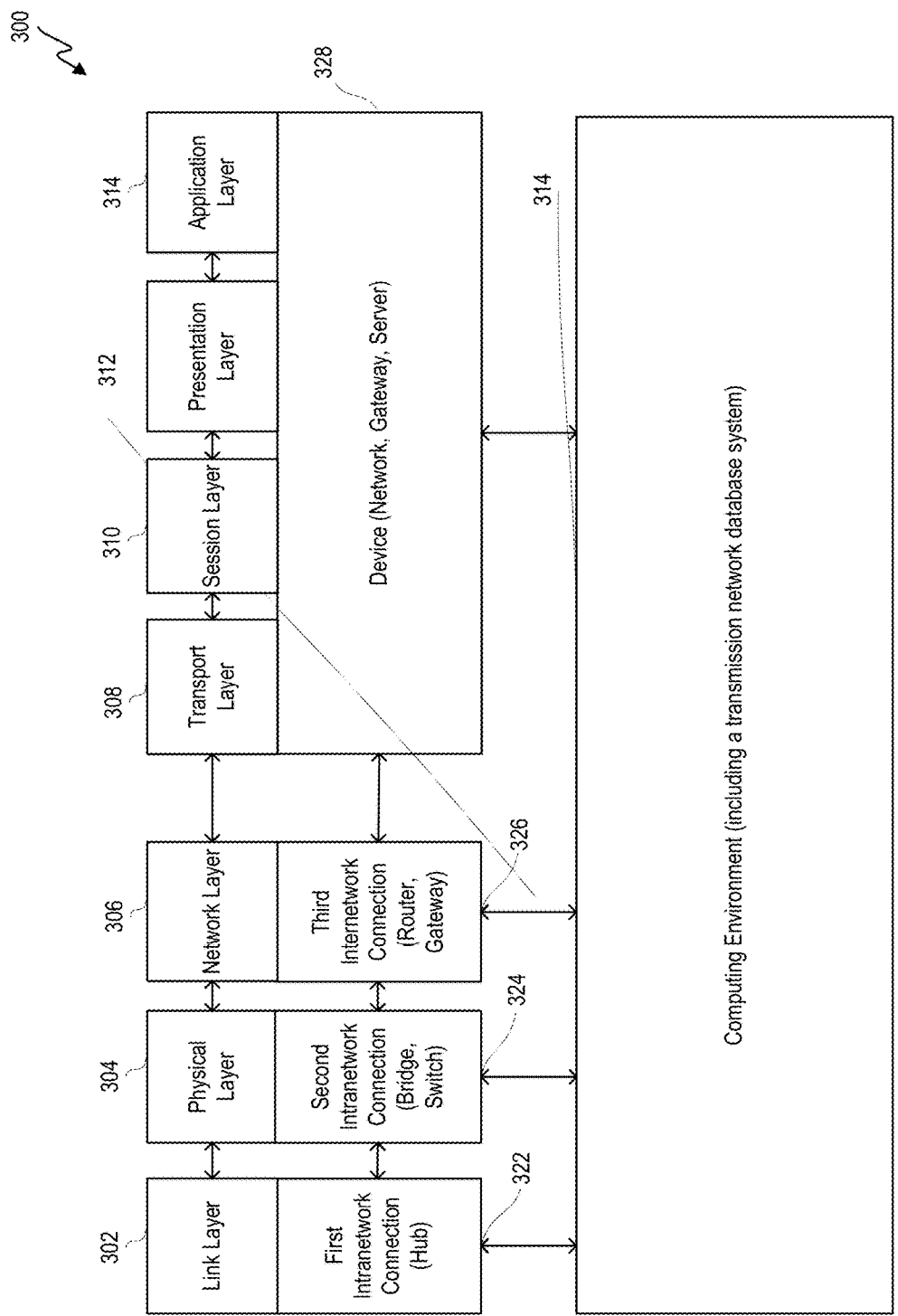
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 316 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer 314, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer 314 is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 316 can interact with and/or operate on, in various embodiments, one, more, all or any of the various layers. For example, computing environment 316 can interact with a hub (e.g., via the link layer) so as to adjust which devices the hub communicates with. The physical layer may be served by the link layer, so it may implement such data from the link layer. For example, the computing environment 316 may control which devices it will receive data from. For example, if the computing environment 316 knows that a certain network device has turned off, broken, or otherwise become unavailable or unreliable, the computing environment 316 may instruct the hub to prevent any data from being transmitted to the computing environment 316 from that network device. Such a process may be beneficial to avoid receiving data that is inaccurate or that has been influenced by an uncontrolled environment. As another example, computing environment 316 can communicate with a bridge, switch, router or gateway and influence which device within the system (e.g., system 200) the component selects as a destination. In some embodiments, computing environment 316 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 316 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
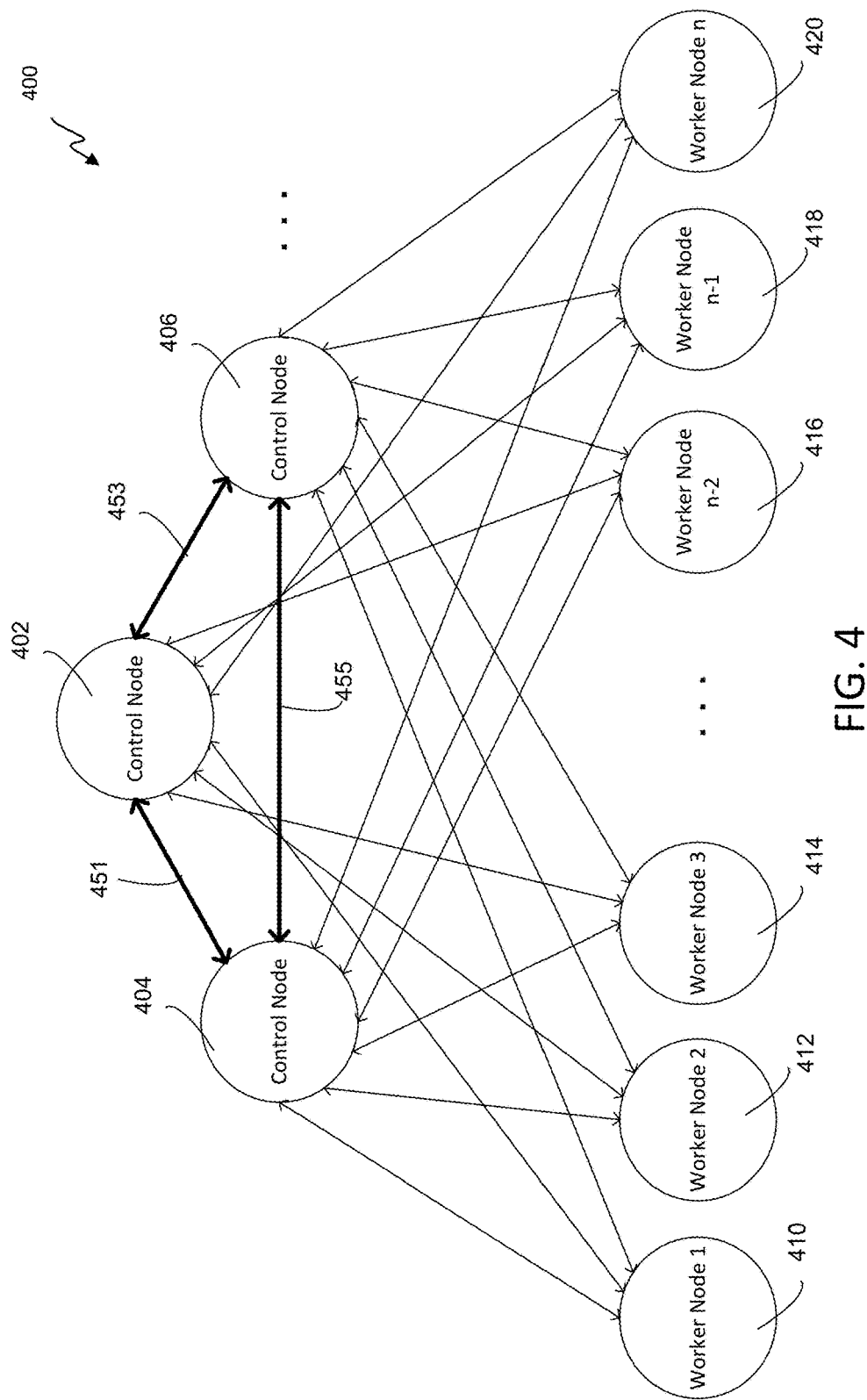
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
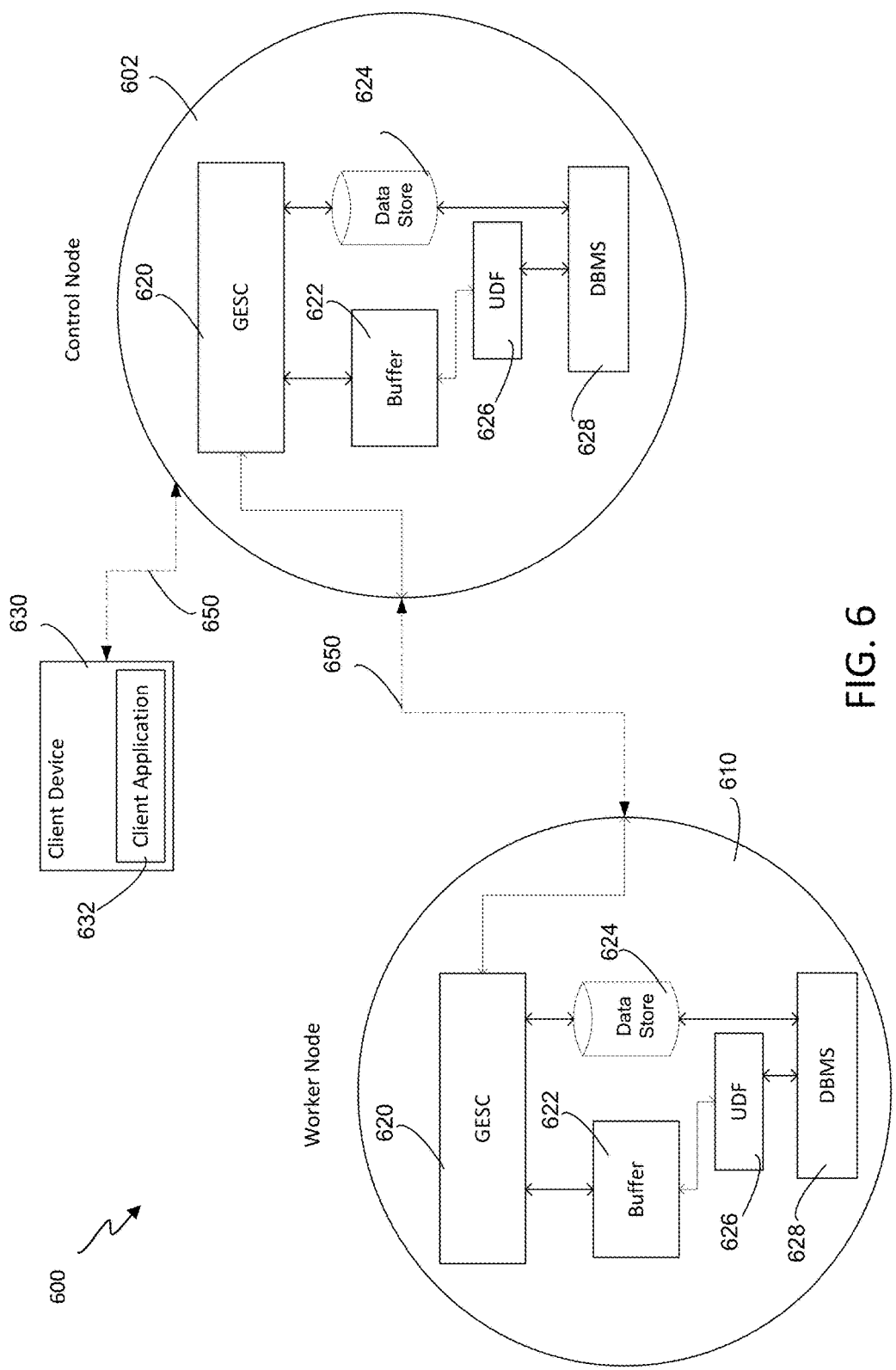
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
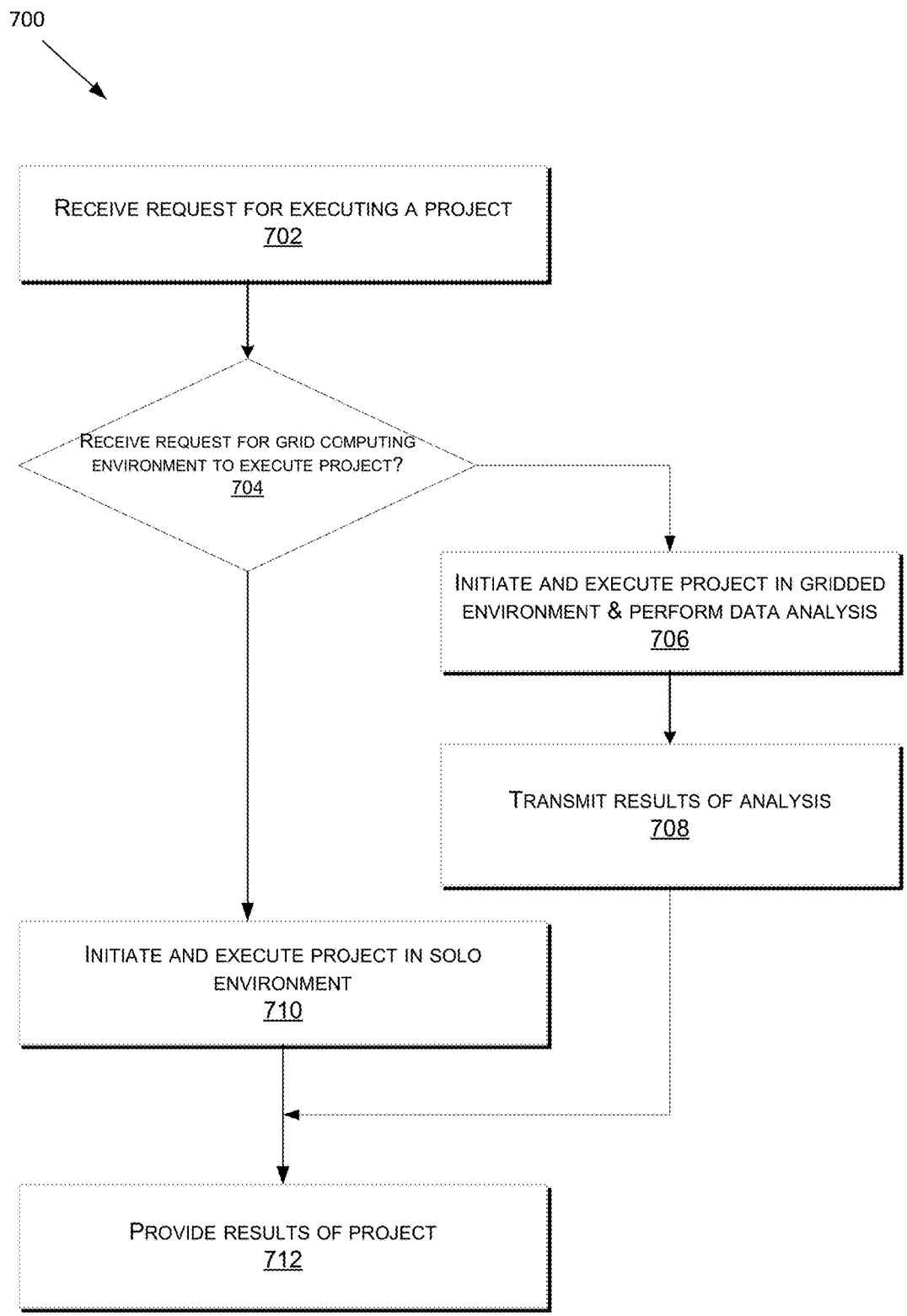
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874*a-c*, according to embodiments of the present technology. ESP system 850 may include ESP device or subsystem 851, event publishing device 872, an event subscribing device A 874*a*, an event subscribing device B 874*b*, and an event subscribing device C 874*c*. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874*a*, event subscribing device B 874*b*, and event subscribing device C 874*c*. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874*a*, event subscribing device B 874*b*, and event subscribing device C 874*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874*a*, event subscribing device B 874*b*, and event subscribing device C 874*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874*a* using the publish/subscribe API. Subscribing client B 856 may be started by an event subscription application B executing at event subscribing device B 874*b* using the publish/subscribe API. Subscribing client C 858 may be started by an event subscription application C executing at event subscribing device C 874*c* using the publish/subscribe API.

An event block object containing one or more event objects is injected into a source window of the one or more source windows 806 from an instance of an event publishing application on event publishing device 872. The event block object may generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874*a*, event subscription device B 874*b*, and event subscription device C 874*c*. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874*a-c*. For example, subscribing client A 804, subscribing client B 806, and subscribing client C 808 may send the received event block object to event subscription device A 874*a*, event subscription device B 874*b*, and event subscription device C 874*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
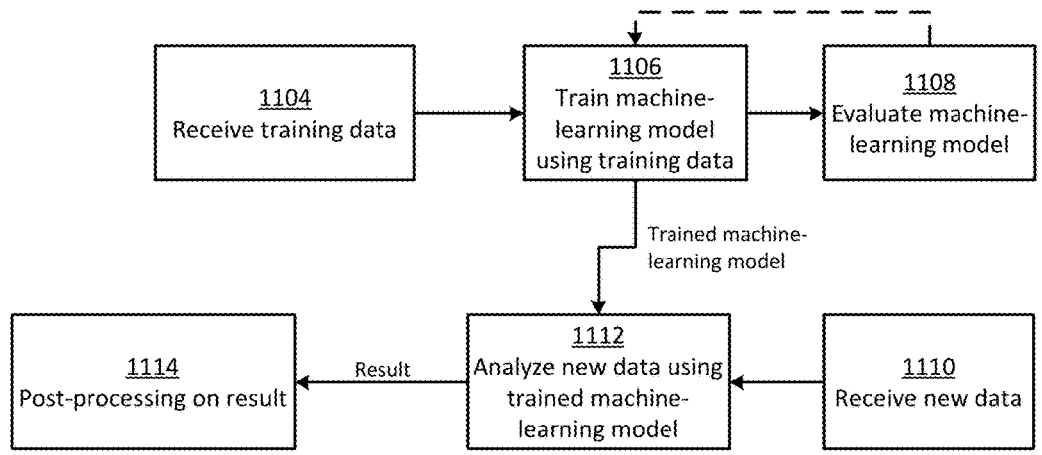
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
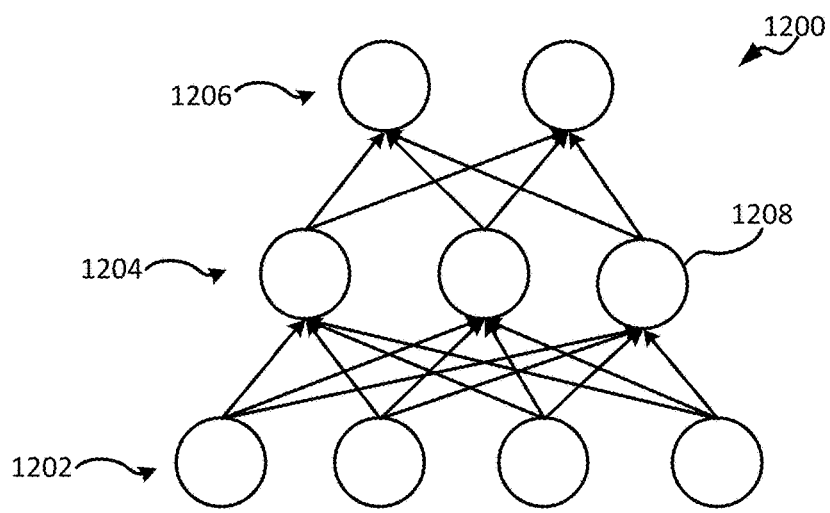
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13A:
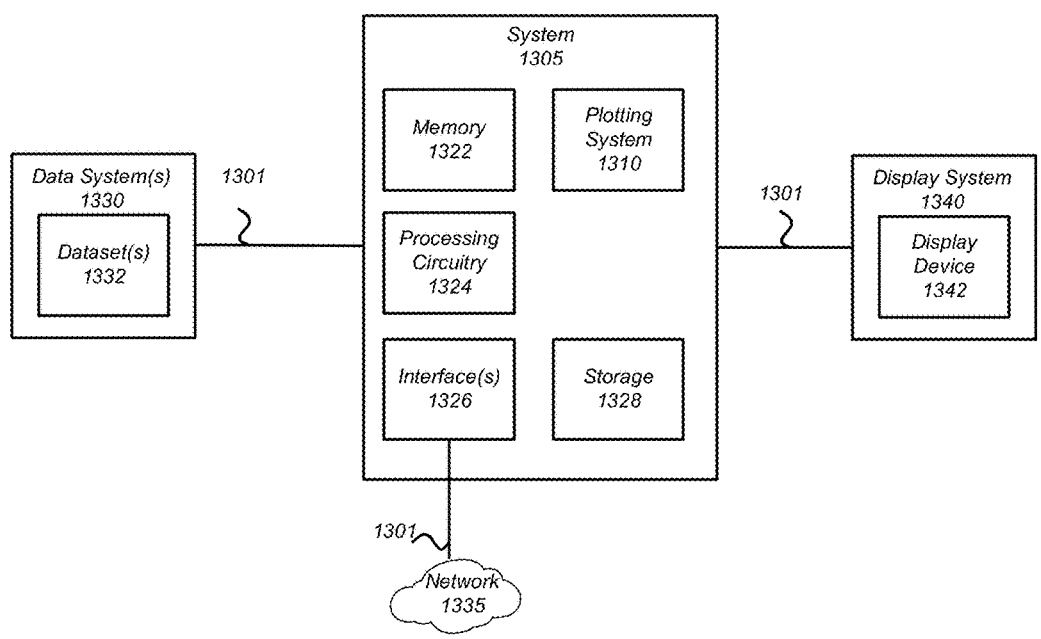
FIGS. 13A/13B illustrate examples of a distributed processing system.

FIGS. 13A/13B illustrate examples of a distributed processing system environment 1300 to process data and generate scalable plots. The processing system environment 1300 may utilize a grouping method, such as clustering or binning, to enable processing large datasets that were previously too computationally intensive to generate plots in a reasonable amount of time. The processing system environment 1300 also enables generation of segmented plots such that a user can drill down on curves to reveal additional information or a number of curves making up the curve at a higher level. In embodiments, the computing system environment 1300 includes a number of connected systems to enable processing of data and plot generation. Moreover, the computing system environment includes a system 1305 having a number of components coupled with other systems, including a data system 1330, and a display system 1340. Each of the systems 1330 and 1340 may include a number of processing and networking elements and may be coupled with system 1305 via one or more wired and/or wireless links 1301.

The data system 1330 may include one or more storage devices to store data 1332. The information and data can be stored in any type of data structure, such as databases, lists, arrays, trees, hashes, files, and so forth. Further, the one or more of the data system 1330 can include a Network-attached storage (NAS), Direct-attached storage (DAS), a Storage area network (SAN), include storage devices, such as magnetic storage devices and optical storage devices. The storage may also include volatile and non-volatile storage. Embodiments are not limited in this manner.

In embodiments, the display system 1340 may include processing circuitry, memory, and a display device 1342 to display information and plots. The display device 1342 may include any type of display including, but not limited to, Cathode ray tube display (CRT), Light-emitting diode display (LED), Electroluminescent display (ELD), Plasma display panel (PDP), Liquid crystal display (LCD), High-Performance Addressing display (HPA), Thin-film transistor display (TFT), Organic light-emitting diode display (OLED). In some embodiments, the display 1340 may include a projector to display on a wall or another surface. Embodiments are not limited to these examples.

System 1305 also includes a number components, including, but not limited to, memory 1322, processing circuitry 1324, one or more interfaces 1326, and storage 1328. The system 1305 may be coupled with one or more other systems, components, devices, networks, and so forth through network environment 1335.

Storage 1328 may be any type of storage, including, but not limited to, magnetic storage and optical storage, for example. The storage 1328 may store information and data for system 1305, such as information for processing by the system 1305. In embodiments, the storage 1328 may store information, data, one or more instructions, code, and so forth for the modeling system 1310. Embodiments are not limited in this manner.

The memory 1322 of system 1305 can be implemented using any machine-readable or computer-readable media capable of storing data, including both volatile and non-volatile memory. In some embodiments, the machine-readable or computer-readable medium may include a non-transitory medium. The embodiments are not limited in this context. The memory 1322 can store data momentarily, temporarily, or permanently. The memory 1322 stores instructions and data for system 1305, which may be processed by processing circuitry 1324. For example, the memory 1322 may also store temporary variables or other intermediate information while the processing circuitry 1322 is executing instructions. The memory 1322 is not limited to storing the above-discussed data; the memory 1322 may store any type of data.

In embodiments, the system 1305 may include processing circuitry 1324 which may include one or more of any type of computational element, such as but not limited to, a microprocessor, a processor, central processing unit, digital signal processing unit, dual-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processing circuitry, processor or processing circuit on a single chip or integrated circuit. The processing circuitry 1322 may be connected to and communicate with the other elements of the system 1305 including the plotting system 1310, the storage 1328, the memory 1322, and the one or more interfaces 1320.

The system 1305 may also include one or more interfaces 1326 which may enable the system to communicate with the network environment 1335. In some embodiments, the interfaces 1326 can be a network interface, a universal serial bus interface (USB), a Firewire interface, a Small Computer System Interface (SCSI), a parallel port interface, a serial port interface, or any other device to enable the system 1305 to exchange information.

The system 1305 may also include a plotting system 1310 to process data and generate plots that are scalable and/or segmented to provide visual information to a user on a display device, for example. Traditional plots require the creation of a plot dataset in which data, e.g., the data used to fit the black box model, is replicated once for each unique combination of the values of the variables being plotted. Thus, they scale poorly with plot variables that have many unique values especially continuous variables and datasets that have many rows.

In embodiments, the plotting system 1310 may use clustering to generate plots with dramatically improved scalability. For example, the plotting system 1310 can apply k-prototypes clustering to a dataset to derive k cluster centers. The number of clusters may be determined via the Aligned Box Criteria (ABC) method, as discussed in U.S. Pat. No. 9,424,337 to Hall et al. and incorporated by reference. In some instances, a user may set a maximum number of clusters to perform. The k cluster centers are treated as a proxy representation of the original dataset. The proxy dataset retains the original input features but with a greatly reduced number of data. The plotting system 1310 computes and generates the plot using the replicated proxy dataset, and average weighted scores, e.g., average weighted $\hat{y}$ values, that are used to take into account variation in cluster sizes. Thus, big clusters will not improperly dominate the average calculated over the replicated proxy dataset. In one example, a dataset with 1 million observations and 1000 unique values of a plot variable that when fully replicated has a size of 1 billion observations. By applying k-prototype cluster the 1 billion observations can be reduced to 100,000 or fewer observations. Thus, the plotting system 1310 requires much less disk storage space and computational resources to generate accurate plots. Moreover, the plotting system 1310 enables much faster plot generation yet provides a faithful representation of the traditional plot that would be obtained using the fully replicated dataset. Embodiments are not limited in this manner. For example, the plotting system 1310 may utilize a different grouping method, such as sampling, binning, and so forth to achieve similar computational and memory savings.

In embodiments, the plotting system 1310 generates plots that are model agnostic and produce measurement-level appropriate 1-Dimension (1-D) and 2-D graphs; the plots include a variety of plot types including bar, scatter, contour, heatmap, response surface, and so forth. In embodiments, the plotting system 1310 may generate partial dependence (PD) plots, Individual Conditional Expectation (ICE) plots, and so forth that depicts the functional relationship between one or more model inputs and the predicted values. For example, the plots may show the partial dependence of a model's prediction on a small selected subset of variables. The plots can be used to profile nonlinearities and interactions and used to compare and evaluate candidate models. Moreover, the plots are visualization tools that help analysts understand how important variables 'work' in a black box predictive model.

The plotting system 1310 can also generate plots that are segmented such that a user can drill down on curves to reveal additional information or a number of curves making up the curve at a higher level. For example, the plotting system 1310 may generate segmented ICE plots with optimal k-prototype clustering of individual curves to uncover the typical ways in which the input variable of interest relates to the model's predictions. In one specifically example, the Aligned Box Criterion (ABC) method is utilized to choose the optimal number of curves automatically, e.g., without user intervention. This approach scales well with big data in the compute environment and, in addition, facilitates drilling down to individual curves. Visually, the overview/drill-down approach, as discussed herein, is more digestible and user-friendly than the original plots. In one example, ICE plots may provide a fine-grained picture of the relationship between an input variable and a model's predictions. However, the fine granularity of the plots may present visualization challenge because there could be millions of individual curves to plot, e.g., one per observation.

In embodiments, the plotting system 1310 computes each curve for each observation. The plotting system 1310 may use the entire dataset, without grouping, such as clustering, sampling, binning, etc., if the dataset is small, e.g., less than or ~1000 observations. In other instances, the plotting system 1310 may perform grouping, such as clustering, sampling, binning, etc., on the dataset prior to computing each individual curve when the dataset is large, e.g., greater than 1000 observation. For example, the plotting system 1310 may randomly sample observations from the dataset to reduce the size of the data set prior to computing the each curve to reduce computational resource usage. In embodiments, the plotting system 1310 may determine whether to perform grouping based on the number of observations and the number of unique values of the variable(s) of interest. For example, a dataset having many unique values may require and/or use a lot of processing resources to process in a reasonable amount of time, even for small datasets. In this case, the plotting system 1310 may determine to perform grouping. Note that embodiments are not limited to these examples. In some instances, the plotting system 1310 may determine whether a dataset is small or large based on the computing resources available and a desired amount of time in which to generate the plots. In either case, the plotting system 1310 does not plot each individual curve, but utilizes clustering, such as k-prototype clustering, to segment the individual curves. The plotting system 1310 plots the segmented plots and each curve in a segment plot represents a derived cluster of curves rather than an individual curve. A segmented plot summarizes the individual variation around the partial dependence function without overwhelming the consumer with individual curves. The plotting system 1310 also enables a consumer to drill down on each segmented curve to individual curves. For example, the plotting system 1310 may receive an input selection of a particular segmented curve and generate new plots including each of the individual curves represented by the particular segmented curve selected by the user.

Figure 13B:
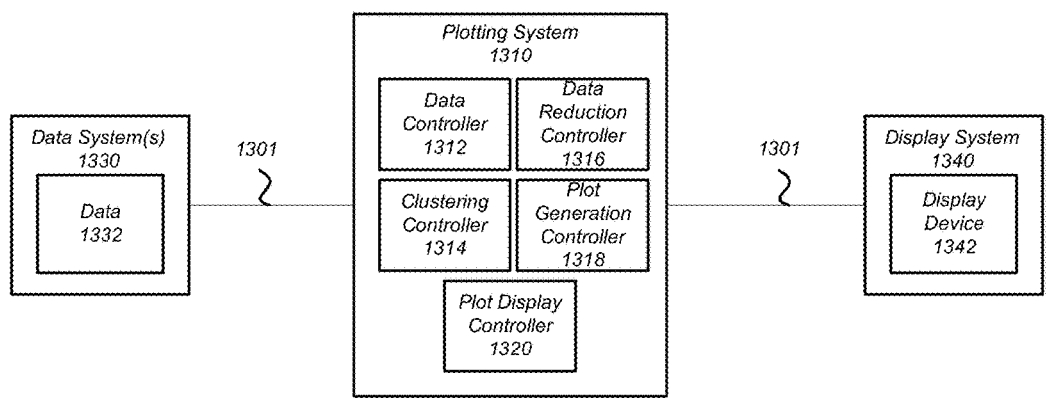

FIG. 13B illustrates an example computing system environment 1350 illustrating a number of controllers of plotting system 1310 to perform operations discussed. In embodiments, the computing system environment 1350 may be the same or similar to computing system environment 1300 of FIG. 13A. In embodiments, the plotting system 1310 includes a data controller 1312, a clustering controller 1314, a data reducing controller 1316, a plot generation controller 1318, and a plot display controller 1320. In embodiments, the data controller 1312 may obtain a dataset that may be used by the plotting system 1310 to generate plots. As previously discussed, the plotting system 1310 may be utilized to generate plots to illustrate the functional relationship between one or more inputs and a model's predictions. In embodiments, the plotting system 1310 may generate PD plots using a grouping method, such as clustering. In embodiments, the data controller 1312 may be utilized to process a plot request to generate one or more plots.

Figure 14:
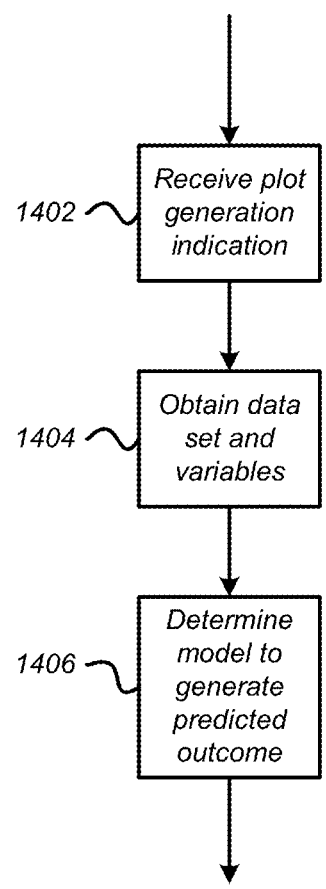
FIG. 14 illustrates an example of a logic flow to process a plot request.

FIG. 14 illustrates one possible logic flow 1400 that may occur during operation of a data collection routine and to process the plot request performed by the data controller 1312. At block 1402, the data controller 1312 may receive an indication of a plot generation request. The indication may be based on a request generated by a user, for example, and the request may be received by the plotting system 1310 via an input. In one example, a user may use an input device interacting with a graphical user interface (GUI) to cause generation of a plot using a dataset and a model. The indication may include information, such as an identifier of the dataset to use to generate plots, a location of the dataset, a model and/or location of model score code, one or more variables to plot, and column metadata (target, inputs).

At block 1404, the data controller 1312 may obtain the dataset including observations and variables from one or more sources, such as data system 1330, which can include one or more databases, network entities, websites, data servers, and so forth. The dataset may be retrieved or received from a number of databases, each having different parts of the dataset, for example. In some embodiments, the data controller 1312 may utilize the identifier and/or the identified location of the dataset to retrieve the dataset. The data controller 1312 may determine and obtain the model and/or model score code at block 1406. Embodiments are not limited in this manner. For example, additional information and parameters may be determined, such as a grouping indication to indicate what grouping is to be used, e.g., sampling, clustering, binning, and so forth. The information may also indicate additional information concerning the grouping, e.g., a grouping type (k-prototype clustering), a sampling percent, number of clusters, and so forth. The Data controller 1312 may also determine an output for the plot, e.g., a 1-D plot, a 2-D plot, and so forth. Embodiments are not limited in this manner.

Figure 15:
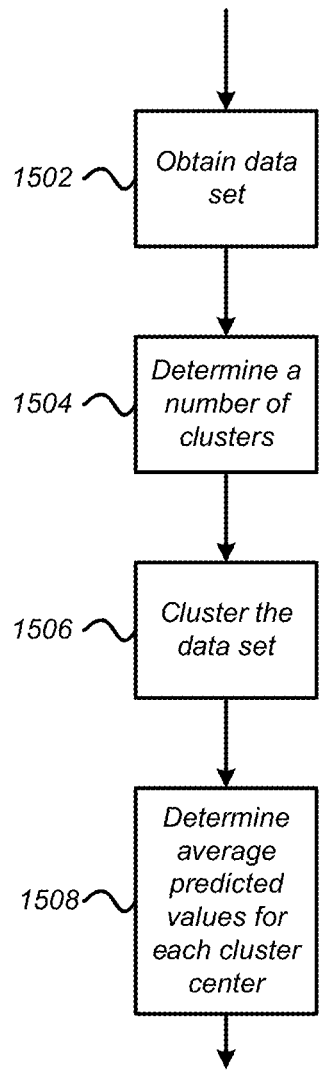
FIG. 15 illustrates an example of a logic flow to perform clustering.

In embodiments, the plotting system 1310 includes a clustering controller 1314 to perform grouping operations to reduce a dataset and generate segmented curves. For example, the clustering controller 1314 may perform clustering on a dataset for generating PD plots. FIG. 15 illustrates one possible logic flow 1500 that may occur to perform a grouping operation on a dataset, determine cluster centers, and determine N-weighted average ŷ values for the cluster centers to generate PD plots. At block 1502, the clustering controller 1314 may obtain the dataset and associated information to perform clustering. The dataset and information may be provided by the data controller 1312, for example. At block 1504, the clustering controller 1314 may determine a number of clusters to generate for the dataset. In one example, the number of clusters may be decided and provided by a user of the system. A user may enter the number of clusters in a GUI via an input device, such as keyboard and/or mouse, for example. In another example, a user may enter a desired level of fidelity and the cluster controller 1314 may determine a number of clusters based on the indicated level of fidelity. For example, the user may enter a number clusters, or a user may specify high fidelity, low fidelity, etc. and the cluster controller 1314 may determine the number of clusters by adjusting the percentage of observation sampled, the ratio of clusters drawn to number of actual observations, and so forth. In some embodiments, the number of clusters may be determined automatically by the clustering controller 1314 by examining characteristics of the dataset and applying the ABC method. The characteristics may include the shape and scale of distribution points in the dataset, proximity vs. spread of the points in N dimensions, and so forth, and points in close proximity will tend to be in the same cluster. Embodiments are not limited to these examples and other techniques may be utilized to determine the number of clusters, e.g., the percentage of variance as a function of the number of clusters, applying criterion such as Akaike information criterion (AIC), Bayesian information criterion (BIC), the Deviance information criterion (DIC), and so forth.

In some embodiments, a different grouping operation may be utilized. For example, the clustering controller 1314 may perform sampling of the dataset, and the clustering controller 1314 may determine a percentage value to sample. The percentage value may be user provided, for example. In another example, the clustering controller 1314 may utilize binning or bucketing to group the dataset, e.g., using a central value of a specified interval of the dataset. Embodiments are not limited to this example.

In embodiments, the logic flow 1500 includes the clustering controller 1314 performing clustering or grouping on the dataset at block 1506. For example, the clustering controller 1314 may perform k-prototype clustering on the dataset, where k represents the number of clusters determined at block 1504. Thus, the clustering controller 1314 may generate k clusters each having a cluster center. The k-prototype clustering technique enables clustering for datasets including numerical and categorical attributes. However, embodiments may use other clustering techniques to cluster the dataset, e.g., k-means clustering and other centroid clustering algorithms.

At block 1508 the logic flow 1500 includes the clustering controller 1314 determining an average predicted value for each of the cluster centers. In embodiments, the average predicted values for each of the cluster center centers may be N-weighted average ŷ values. The clustering controller 1314 may generate k cluster centers and assign the objects or data points that are nearest cluster center minimizing the squared distances from the cluster. The distances calculated may be the Euclidean distance or the Manhattan distance, for example. Each of the cluster centers may be associated with the same or approximately the same number of objects of data points. Further, each of the cluster centers is represented by a central vector or cluster center value, which may not necessarily be a member of the data set. The cluster center values may be utilized as proxy representations to replace data in the dataset generating a reduced dataset.

Figure 16:
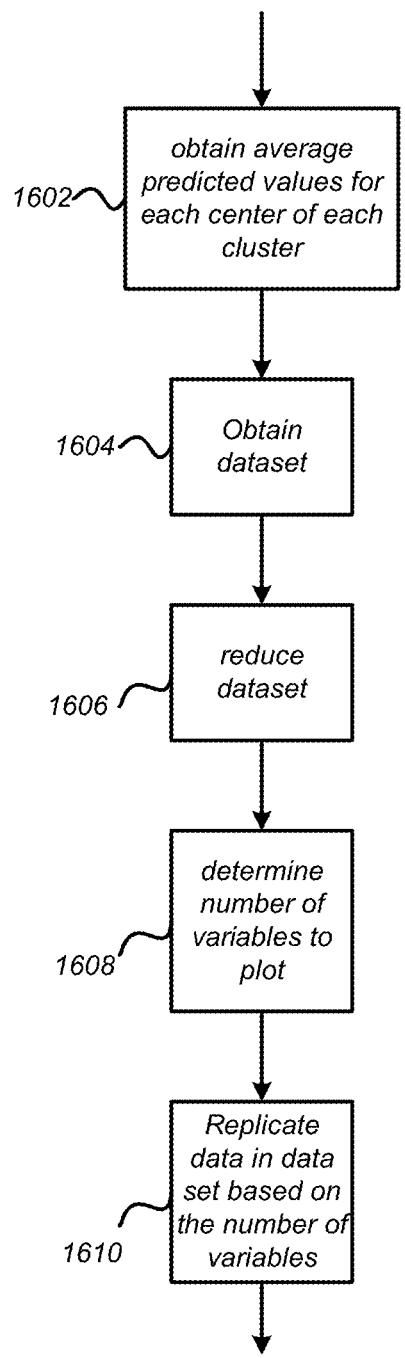
FIG. 16 illustrates an example of a logic flow to perform data reduction.

The plotting system 1310 may include a data reduction controller 1316 to reduce the dataset by utilizing the cluster center values to represent the data in the dataset. The reduced dataset may be used to generate desired plots and reducing the dataset saves computational resources such as computer processing cycles and memory usage when generating the plot. FIG. 16 illustrates one possible logic flow 1600 that may occur to reduce the dataset based on the cluster center values by the data reduction controller 1316. At block 1602, the data reduction controller 1316 obtains the cluster center values for each of the clusters. For example, the cluster center values may be obtained for a data storage system and/or memory. Similarly, the data reduction controller 1316 may obtain the dataset at block 1604. The dataset may also be obtained from storage and/or memory. In one example, the dataset may be obtained from a database stored on a storage system. However, embodiments are not limited in this manner, and the dataset may be stored using other storage methods, e.g., a spreadsheet, a file, and so forth. At block 1606, the data reduction controller 1316 may reduce the dataset using the cluster center values. The reduced dataset may be stored in a database, spreadsheet, file, and so forth. Embodiments are not limited in this manner.

In embodiments, the data reduction controller 1316 replicates the reduced dataset for each unique value of the plot variables. Unique values of the plot variables may include each instance of a value for a variable, and repeated values are excluded, for example. At block 1608, the data reduction controller 1316 may determine the number of variables to plot. The number of variables and/or which variables may be provided by a user via an input or automatically determined via the ABC method, for example. At block 1610, the data reduction controller 1316 may replicate the reduced dataset based on the determined number of variables to plot. More specifically, the data reduction controller 1316 may replicate the reduced dataset x times for an x number of variables. For example, if the data reduction controller 1316 determines that there are ten variables to plot, the data reduction controller 1316 may replicate the reduced dataset ten times. Thus, if the number of clusters is reduced to 1000, each of the 1000 cluster center values or observations are replicated ten times, and the reduced dataset will now have 10,000 values after the replication. Embodiments are not limited to this example. The reduced dataset with replicated values may then be used to generate a plot.

Figure 17A:
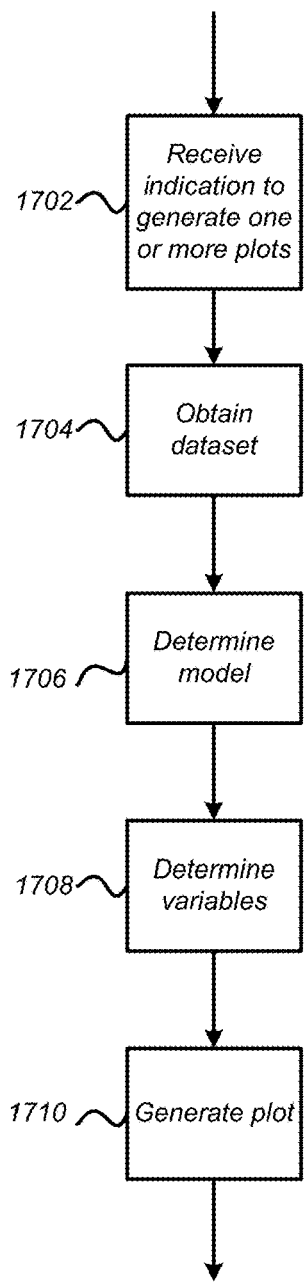
FIG. 17A/17B illustrate examples of logic flows to perform plot generation.

In embodiments, the plotting system 1310 may include a plot generation controller 1318 to generate plots utilizing a reduced dataset. FIG. 17A illustrates one possible logic flow 1700 that may occur by the plotting system 1310 to generate plots. In embodiments, the logic flow 1700 includes receiving an indication to generate one or more plots at block 1702. The indication may be user generated via an interaction with a GUI, for example. In some embodiments, a user may provide input via an input device and interact with a GUI that may trigger or cause execution of one or more portions of code. For example, the input may trigger or cause macro code to run by the plotting system 1310. Table 1 below illustrates one possible example of macro code that may be run to generate a PD plot using a reduced dataset.

TABLE 1

```
%PDPlot (IDS=sampsio.hmeq,
  metadata = work.metadata,
  plotVars = mortdue value,
  scoreCode = %nrbquote(c:\temp\treeCode.sas),
  obsHandling = cluster,
  obsClusters = 100,
  interval2DPlot = contour,
  configFile=/u/rawrig/m□srv.cfg);
```

In Table 1, the macro code defines a number of variables that may be used by the plotting system 1310 to generate plots. For example, the macro code may indicate a location for the dataset (IDS), define metadata, indicate variables to plot (plotVars), indicate score code of a model to use (scoreCode), indicate a grouping to use to cluster data (obsHandler), indicate a number of groups (obsClusters), indicate a type of plot (interval2DPlot), and indicate a location of a configuration file (configFile). Embodiments are not limited to the example macro of Table 1.

In embodiments, the logic flow 1700 includes obtaining the dataset to utilize to generate the plots at bock 1704. The dataset may be stored in one or more storage locations in storage. The plotting system 1310 may identify the dataset and the location of the dataset based on the information in the macro code. In the illustrated example in Table 1, the dataset may be identified as "sampsio.hmeg," for example. In some embodiments, the dataset may be identified by a user via an input device. The dataset may include observations and may be a reduced dataset including replication of data based on the number of plot variables.

At block 1706, the logic flow 1700 includes determining a model to use to run the dataset through to generate the plots. Similarly, the model may also be identified in the macro code. In the illustrated example, the model and a location of the model may be identified by the "scoreCode" variable in the macro code, e.g., scoreCode=% nrbquote(c:\temp\treeCode.sas). The identified model and, in particular, the score code may be a score function used to process the dataset to generate the plots. For example, the plotting system 1310 may score each of the clusters using a scoring function of the model using the cluster centroids as observations. The scores may be ŷ values. Thus, average ŷ values or average scores may be determined across the clusters and the average scores are weighted using the cluster frequency to generate average weighted scores. In embodiments, the plotting system 1310 may identify other variables that may be used to generate the plots at block 1708. For example, the plotting system 1310 may determine the metadata for generating the plot, variables to plot, a grouping to use, a number of groups, a type of plot, and a location of a configuration file with further configuration information.

At block 1710, the plotting system 1310 may generate one or more plots using the information provided in the macro code, the dataset, the model and so forth. For example, the plotting system 1310 may generate one or more plots and each plot corresponds with a variable of the one or more variables plotted against one of the weighted average scores by applying the model to the reduced dataset to visually indicate the effect that the one or more variables has on the predicted outcome. In some instances, e.g. for continuous variable, many unique values may exists. In these instances, binning or another grouping method may be applied to the values to reduce the number of replications. The plots may be generated and presented to a user in a display on a display device. Embodiments are not limited to this example.

Figure 17B:
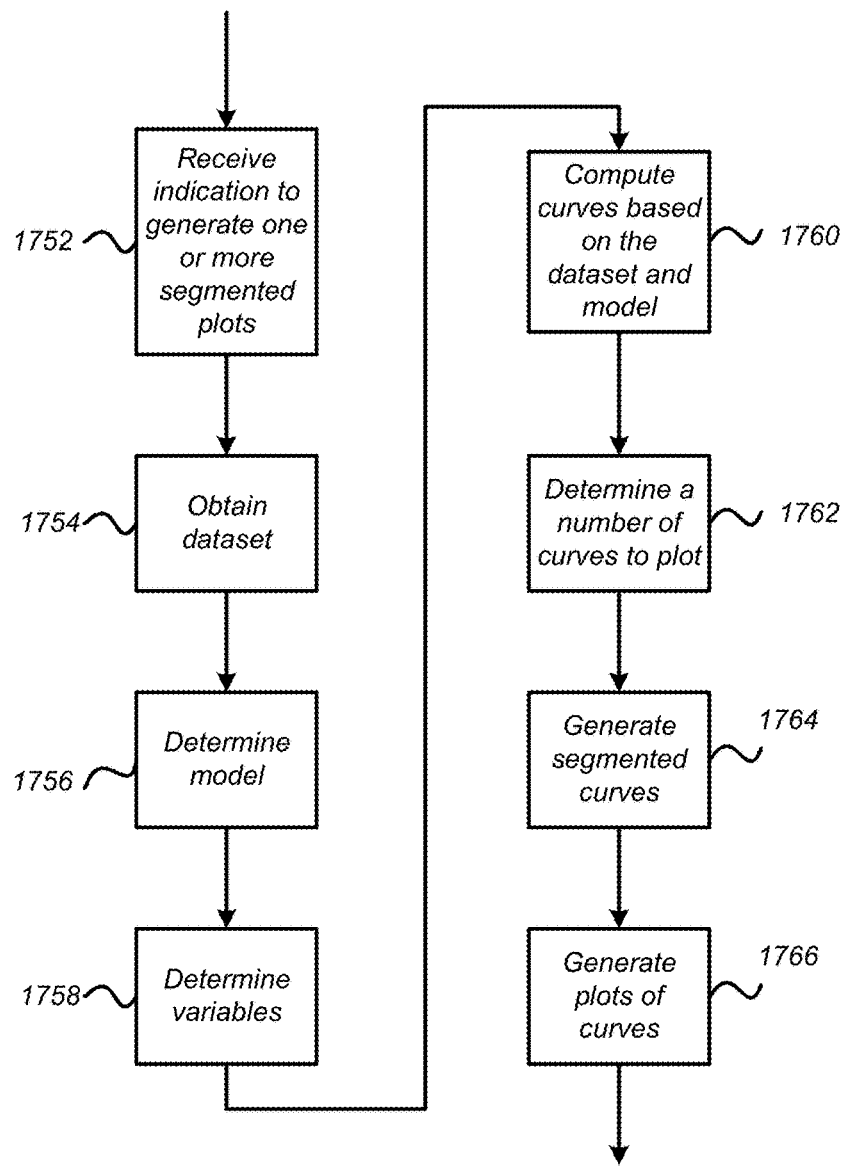

In some embodiments, the plotting system 1310 may generate segmented plots where one or more plots or lines may each represent a number of plots or lines. FIG. 17B illustrates one possible logic flow 1750 that may occur by the plotting system 1310 including the plot generation controller 1318 to generate segmented plots. In embodiments, the logic flow 1750 includes receiving an indication to generate one or more segmented plots at block 1752. The segmented plots may be one or more curves each representing a number of additional curves. The indication may be user generated via an interaction with a GUI, for example. In some embodiments, a user may provide an input via an input interacting with GUI that may trigger or cause execution of code. For example, the input may trigger or cause a macro to run by the plotting system 1310. Table 2 below illustrates one possible example of macro code that may be run to generate a segmented ICE plot.

TABLE 2

```
%icePlot(
  IDS=sampsio.hmeq,
  plotVar=CLNO,
  predictedValues=P_DEBTINC,
  otherVars=JOB REASON CLAGE DEROG LOAN
    MORTDUE NINQ VALUE YOJ,
  codeFile=%nrbQuote(c:\temp\treeCode.sas),
    sampProp=1,
  maxClusters=10
);
```

In Table 2, the macro code defines a number of variables that may be used by the plotting system 1310 to generate segmented plots. For example, the macro code may set a location for the dataset (IDS), define metadata, indicate one or more variables to plot (plotVars), indicate predicted values (predictedValues), define other variables (otherVars) such as a range of values for the variables to plot, indicate score code or score function of a model to use (codeFile), indicate whether to group or sample the dataset (sampProp), and indicate a maximum number of groups or clusters to use when clustering the curves (maxClusters). Although not illustrated, a macro code to generate a segmented plot may also indicate a type of plot and additional configuration used to generate the plot. Embodiments are not limited to the example macro of Table 2.

In embodiments, the logic flow 1750 includes obtaining the dataset to utilize to generate the ICE plots at bock 1754. The dataset may be stored in one or more storage locations in storage, and the plotting system 1310 may obtain the dataset from storage. For example, the plotting system 1310 may identify the dataset and the location of the dataset based on the information in the macro code. In the illustrated example in Table 2, the dataset may be identified as "sampsio.hmeg," for example. In some embodiments, the dataset may be identified by a user via an input, for example. The dataset may include observations. The dataset used to generate segmented plots may be a full dataset if it is small or a grouping (clustering) operation may be applied to the dataset if the dataset is large. For example, clustering may be applied to the dataset as discussed in FIGS. 14-16 prior to generating the segmented plots. In another example, the dataset may be sampled prior to generating the segmented plots, e.g., observations or data may be chosen at random based on an indicated number of samples desired. Embodiments are not limited to these examples.

At block 1756, the logic flow 1750 includes determining a model to use to run the dataset though to generate the segmented plots. The model may also be identified in the macro code. In the illustrated example, the model and a location of the model may be identified by the "codeFile" variable in the macro code, e.g., codeFile=% nrbquote(c:\temp\treeCode.sas). The identified model and, in particular, the score code may be used to process the dataset to generate the segments plots. In embodiments, the plotting system 1310 may identify other variables that may be used to generate the plots at block 1758. For example, the plotting system 1310 may determine the metadata for generating the plot, one or more variables to plot, predicted values, and so forth based on information in the macro code.

At block 1760, the plotting system 1310 may compute curves based on the dataset and the model. More specifically, the plotting system 1310 may determine a variable to plot and a range of values for the variable. The variable may be the input to the model and the range of values may represent possible values for the variable to be used as inputs to generate curves. The variable and the range of values may be specified in the macro code and/or provider by a user of plotting system 1310. The range of values may be determined by a range determination function specified in the macro code, e.g. executes the process "freqtab." In embodiments, the plotting system 1310 may compute a curve for each observation in the dataset across the range of values. Each observation will have an associated curve, e.g., if there are 1000 observations in the dataset, a 1000 curves will be computed. Thus, large datasets can quickly overburden computing resources when plotting curves.

In embodiments, the plotting system 1310 may determine a number of clusters of curves to generate to plot at block 1762. For example, the plotting system 1310 may apply the ABC method using data-oriented reference distributions to determine an optimal number of proxy curves to plot. In other instances, the number of proxy curves to plot may be user determined entered via an input. Embodiments are not limited to these examples, and other methods may be used.

At block 1764, the plotting system 1310 may perform a grouping operation, such as k-prototype clustering, to segment or group the individual curves to reduce computing resource usage when plotting the curves. The plotting system 1310 may apply k-prototypes clustering to the individual curves to derive k clusters and k center curves which may be proxy curves for the cluster of curves, where k is the number of proxy curves determined at block 1762. More specifically, the cluster center curves are treated as a proxy representation of the original curves. The cluster center curves may be determined by minimizing the squared distances from the individual curves of the cluster. Thus, the proxy curves retain the original input features but with a greatly reduced number of curves and data points presenting the curves. At block 1766, the plotting system 1310 may generate one or more plots of proxy curves using the score code, dataset, variables, and so forth. The plots may be presented to a user in a display on a display device.

Figure 18:
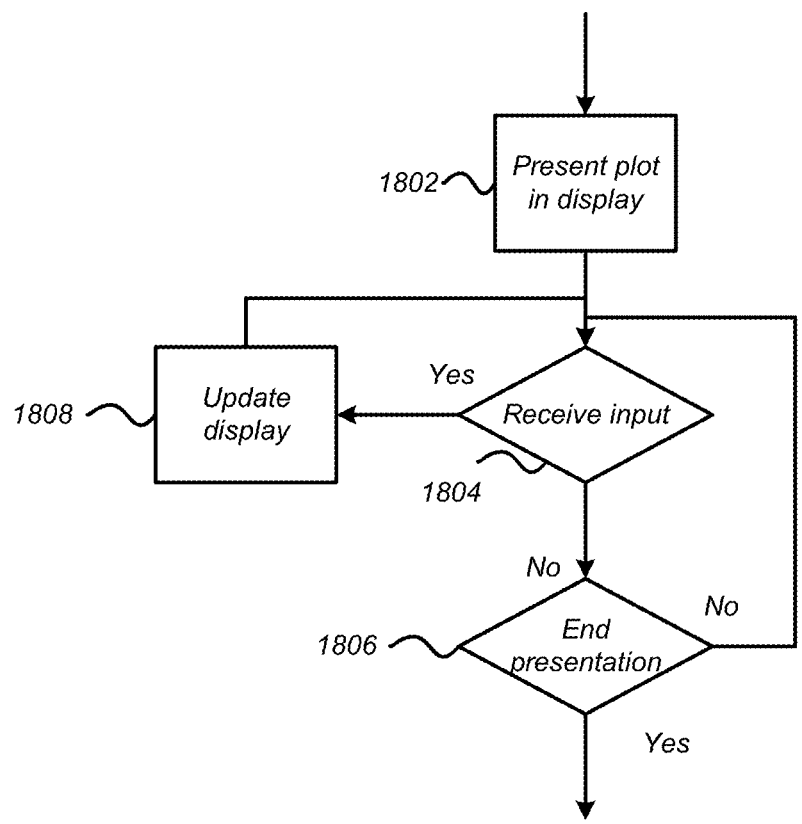
FIG. 18 illustrates an example of a logic flow to process super scenario clusters.

The plotting system 1310 also includes a plot display controller 1320 that may present plots and handle user inputs to manipulate the plots, e.g., present individual curves based on a selection of a segmented or proxy curve for segmented plots. FIG. 18 illustrates one possible logic flow 1800 that may occur to present plots and handle user inputs. As previously, the plotting system 1310 may generate one or more plots using a dataset. At block 1802, the one or more plots may be presented in a display on a display device. For example, the plot display controller 1320 may present the plots in GUI display that can be presented on a display device, such as a computer screen, monitor, a projector, and so forth. Moreover, the plot display controller 1320 may present the plots in that GUI, which may be enabled to accept user input via an input device such as a keyboard, mouse, and so forth. A user may be able to manipulate or interact with the plots. For example, a user may be to zoom in or out on various sections of the plots, rotate the plots, highlight one or more plots (and corresponding data), draw on the plots, select segmented plots, and so forth. At block 1804, the plot display controller 1320 may determine whether any inputs are directed, e.g., an interaction with the GUI and plots.

The plot display controller 1320 may update the display and the plots based on the input at block 1808 when an input detected. For example, the plot display controller 1320 may zoom in or out on a particular area of the display, may rotate the display of the plots, highlight plots in the display, draw an object or figure on the plots, and so forth. In embodiments, the plot display controller 1320 may also process a selection on a segmented or proxy curve representing a number of individual curves. The plot display controller 1320 may update the display and present each of the individual curves represented by the proxy curve. In one example, the curves computed and represented by the proxy curve, but not presented may be utilized by the plot display controller 1320 to present in the display. The plot display controller 1320 may also accept additional inputs when displaying the individual curves. As similarly discussed above, a user may zoom in or out on a portion of the display, rotate the display of the plots, highlight one or more plots, and so forth. These interactions may be provided by a user through the use of an input device, such as a keyboard, mouse, etc., and processed by the system including the plot display controller 1320.

At block 1806, the plot display controller 1320 may determine whether to end the presentation of the display including the plots when an input is not detected at block 1804. If the display is to be continued to be displayed, the plot display controller 1320 continues to determine whether any inputs are detected at block 1804. If the presentation is to be ended, the plot display controller 1320 may cause the display to cease being displayed.

Figure 19A:
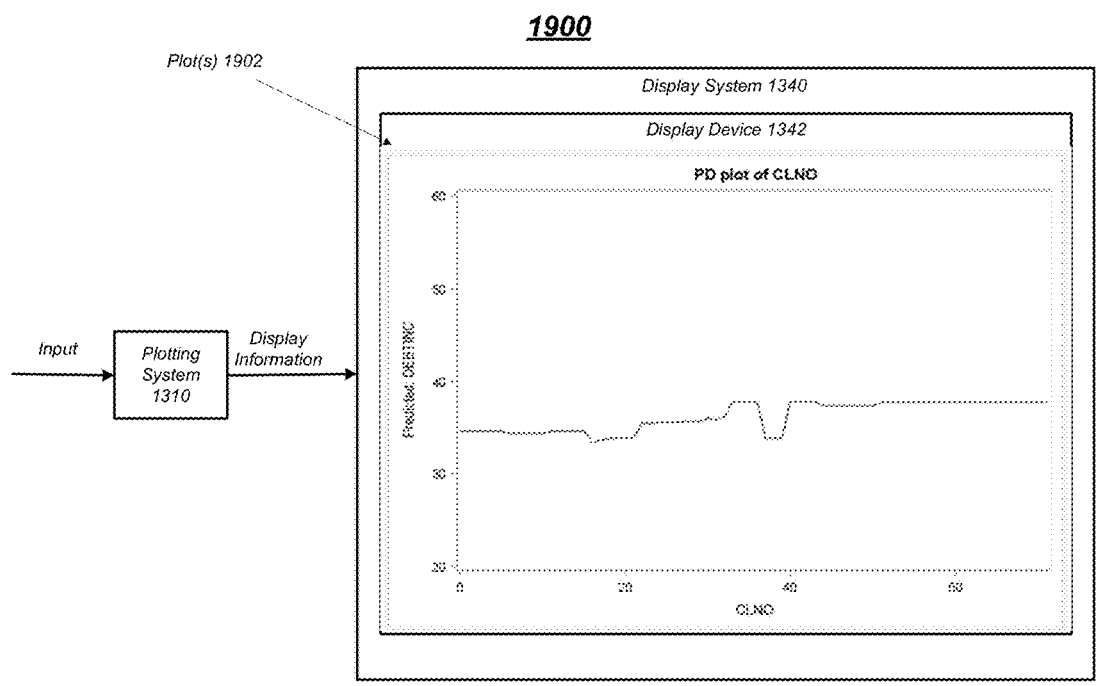
FIGS. 19A/19B illustrate an examples of plots.

FIGS. 19A/19B illustrate examples of systems 1900 and 1950 displaying plots 1902 and 1952, respectively. More specifically, FIG. 19A illustrates a PD plot 1902 of a single variable "CLNO" and the effects on a predicted value "DEBTINC." The plotting system 1310 may receive one or more inputs that may be utilized by the plotting system 1310. The one or more inputs may include data inputs, such as an indication of a location for the dataset, metadata, an indication of variables to plot, an indication of a score code of a model to use, an indication of a grouping to use to cluster data, an indication of a number of groups, an indication of a type of plot, and an indication of a location of a configuration file. The data inputs may further include the dataset itself, the model code, and so forth.

In embodiments, the plotting system 1310 may utilize the inputs to generate the plot 1902 and display information such that the plot 1902 may be presented on the display device 1342 of the display system 1340. For example, the plotting system 1310 may process the indication of the dataset and an indication of the model score code for the model to determine and retrieve the dataset and model score code to generate the one or more plots. The plotting system 1310 may also process an indication of a type of clustering to perform on the data set, and perform the clustering on the dataset to generate the clusters based on the indication of the type of cluster, e.g., k-prototype clustering. Further, the plotting system 1310 may process an indication of one or more variables to plot, determine the number of variables to plot based on the indication of the one or more variables and replicate each of the cluster center values of the reduced dataset once for each of the number of variables to plot. The reduced dataset with replicated cluster center values may act as proxy representations and are used to generate the plot 1902. Embodiments are not limited to these examples. The plotting system 1310 may process additional information and data to generate the plots.

Figure 19B:
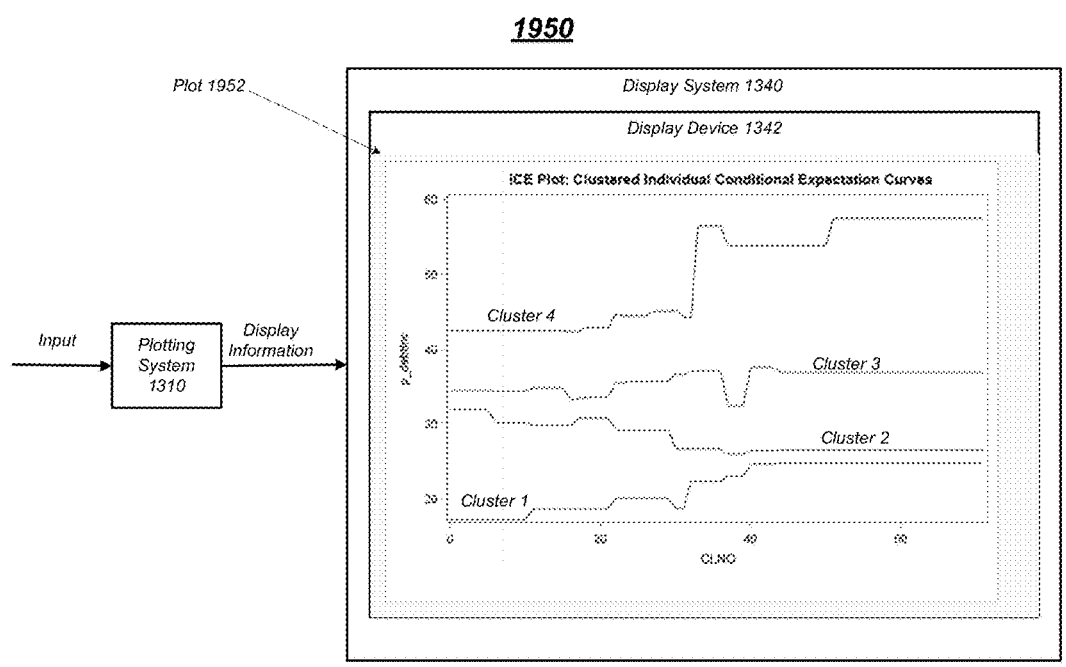

FIG. 19B illustrates an example of an ICE plot 1952 including clustered or segmented curves each of which represents a plurality of curves. In the illustrated example, the plotting system 1310 may receive and process one or more inputs, such as a location for the dataset, metadata, variables to plot, predicted values, other variables, score code of a model to use, indicate whether to group or sample the dataset, and an indication of a maximum number of groups or clusters to use when clustering the curves. The inputs may also include the dataset itself and the score code for the model. The plotting system 1310 may utilize the inputs and generate the ICE plots 1952. The plotting system 1310 may communicate display information to a display 1342 and a display system 1340 which may present the ICE plots 1952. Embodiments are not limited in this manner.

Figure 20A:
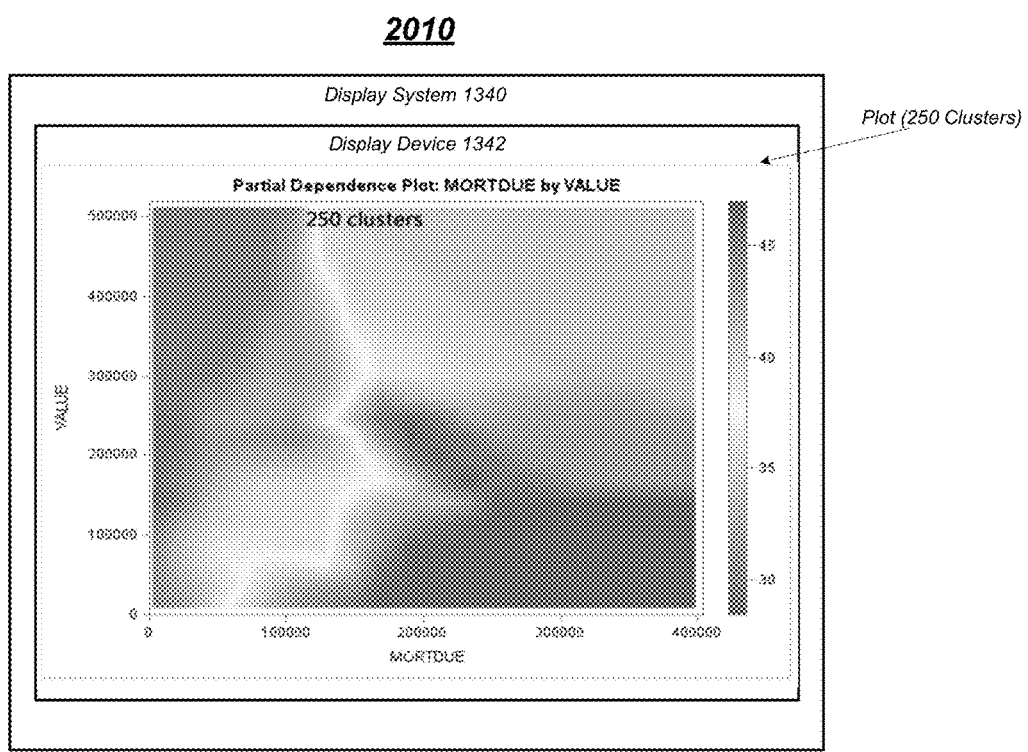
FIGS. 20A-20D illustrates examples of partial dependency plots with various levels of fidelity.
Figure 20B:
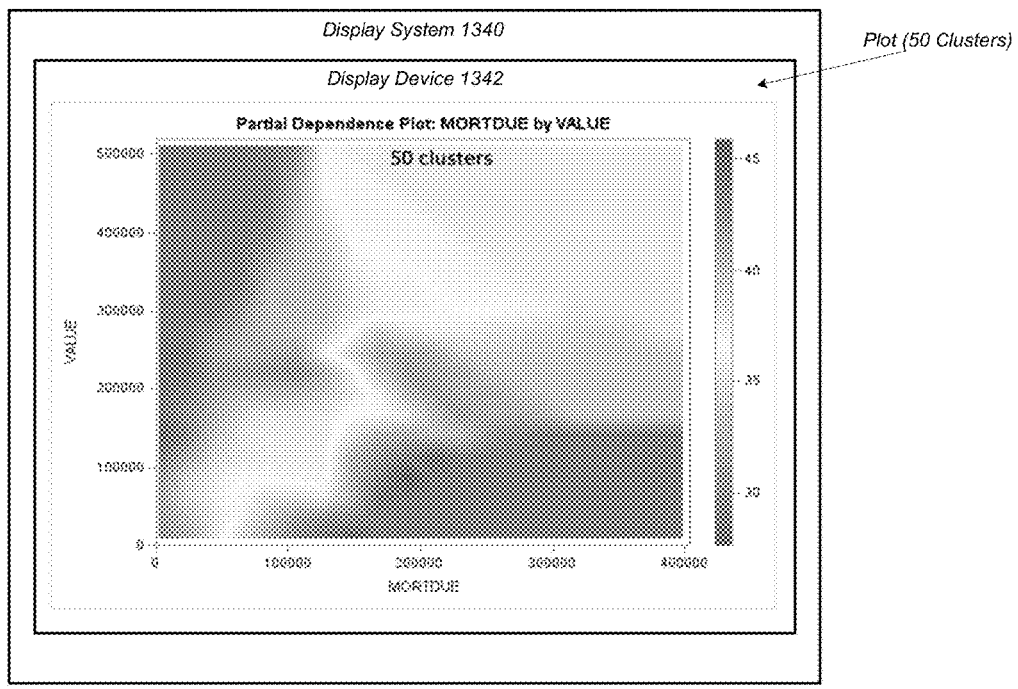
Figure 20C:
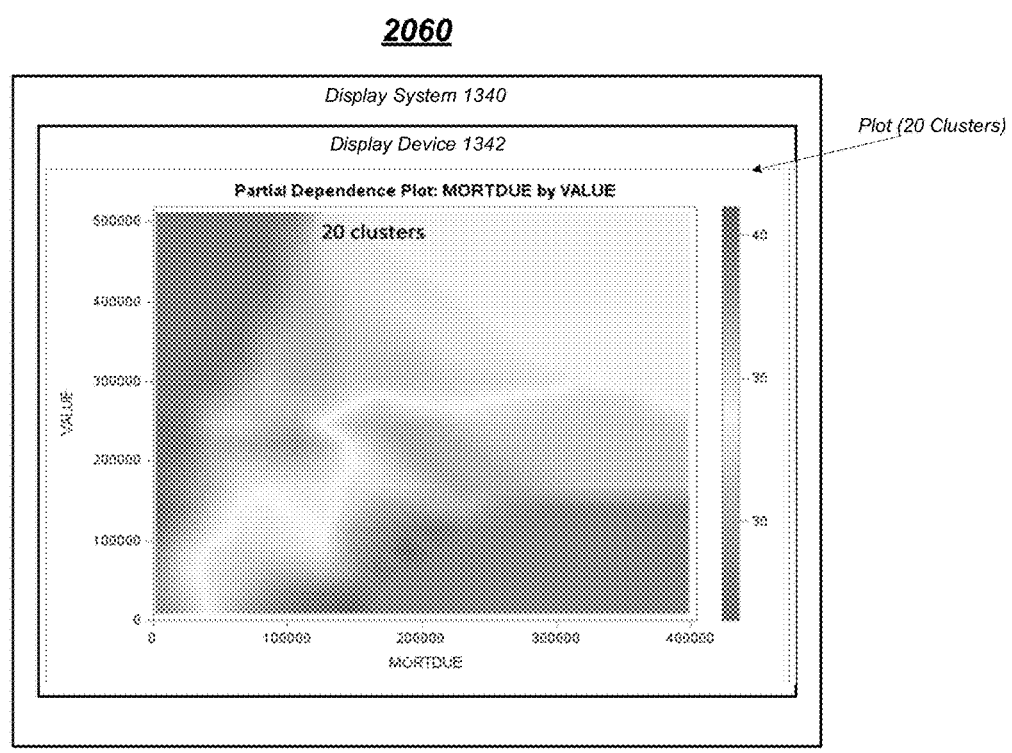
Figure 20D:
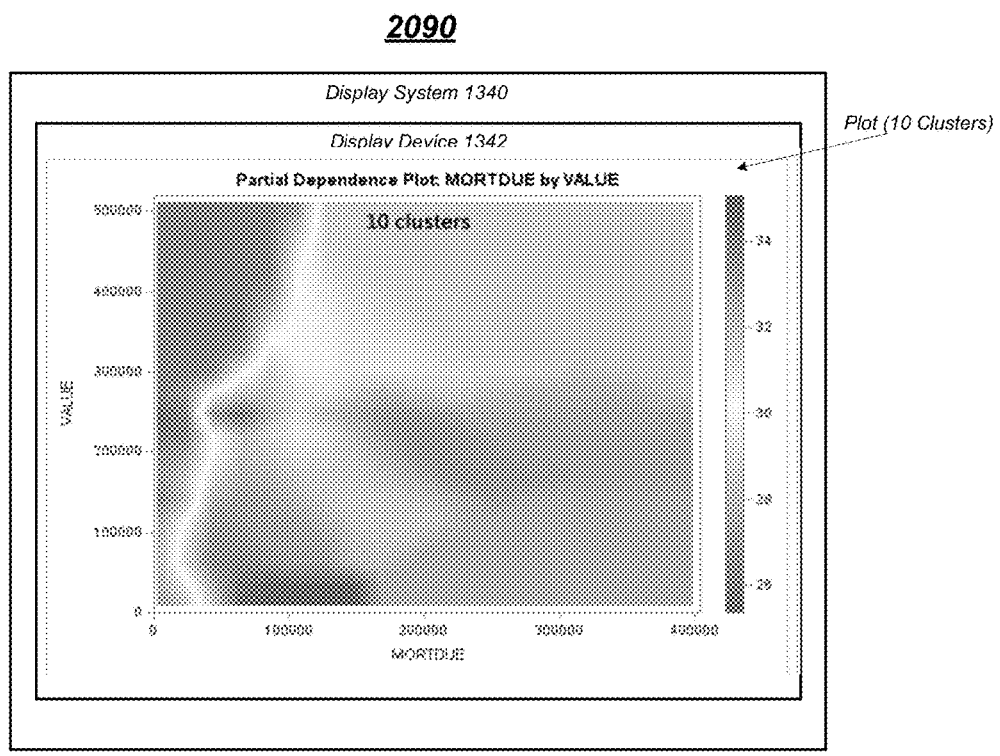

FIGS. 20A-20D illustrate further examples of PD plots 2010, 2030, 2060, and 2090. Each of the PD plots 2010, 2030, 2060, and 2090 illustrate the same dataset processed with the same model and score code, but with different levels of fidelity, e.g., the number of clusters utilized to reduce the dataset. FIG. 20A illustrates PD plot 2010 expressing information in a heat map 2D plot using 250 clusters to generate the reduced dataset, FIG. 20B illustrates PD plot 2030 expressing information in a heat map 2D plot using 50 clusters to generate the reduced dataset, FIG. 20C illustrates PD plot 2060 expressing information in a heat map 2D plot using 20 clusters to generate the reduced dataset, and FIG. 20D illustrates PD plot 2090 expressing information in a heat map 2D plot using 10 clusters to generate the reduced dataset. As clearly illustrated in FIGS. 20A-20D, as the number of clusters, decreases fidelity and usefulness of plot decreases. However, as the number of clusters increases more computer resources are utilized, and generation of the plots takes longer. Thus, the number clusters used to generate a PD plot is generally a balance between a desired level of fidelity and resources available. In embodiments, a user may specify a number of clusters; the plotting system may determine a number of clusters using the ABC method, or the plotting system may determine the number of clusters using another method. Embodiments are not limited in this manner.

Figure 21A:
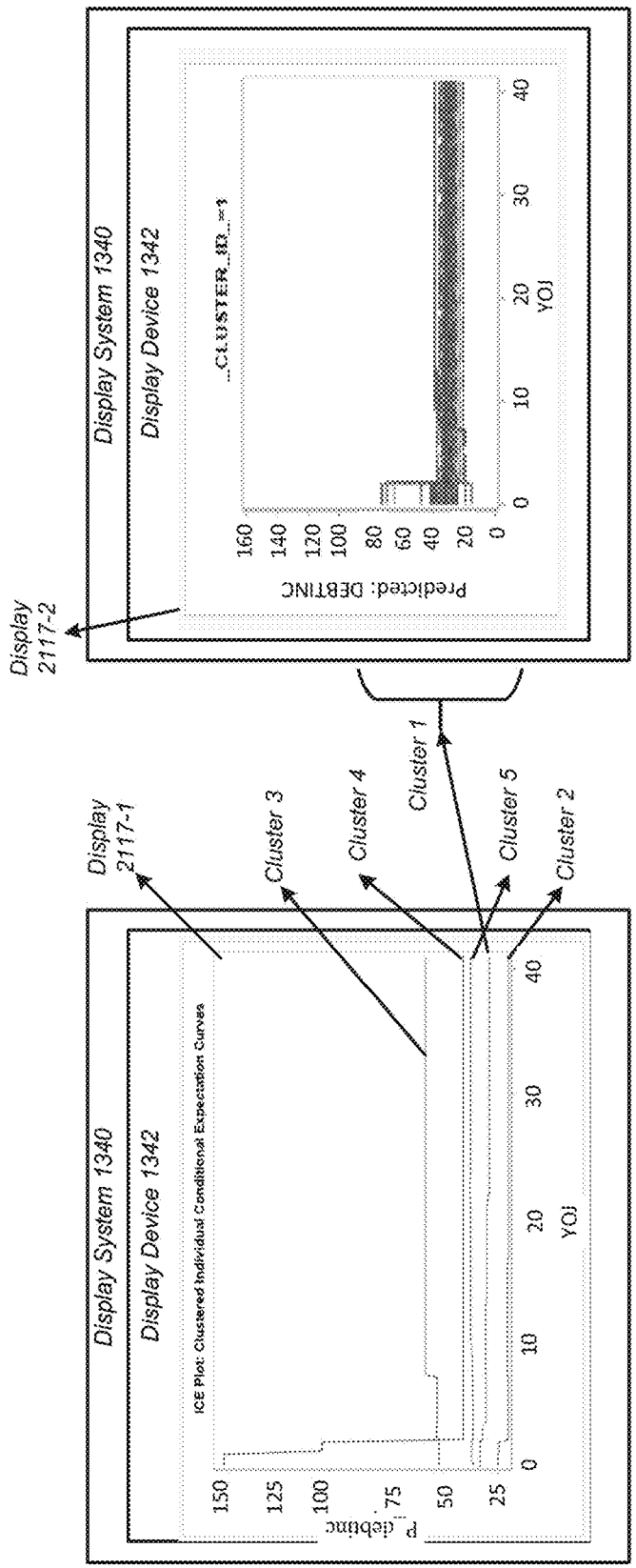
FIGS. 21A-21E illustrate examples of segmented individual conditional expectation (ICE) plots.
Figure 21B:
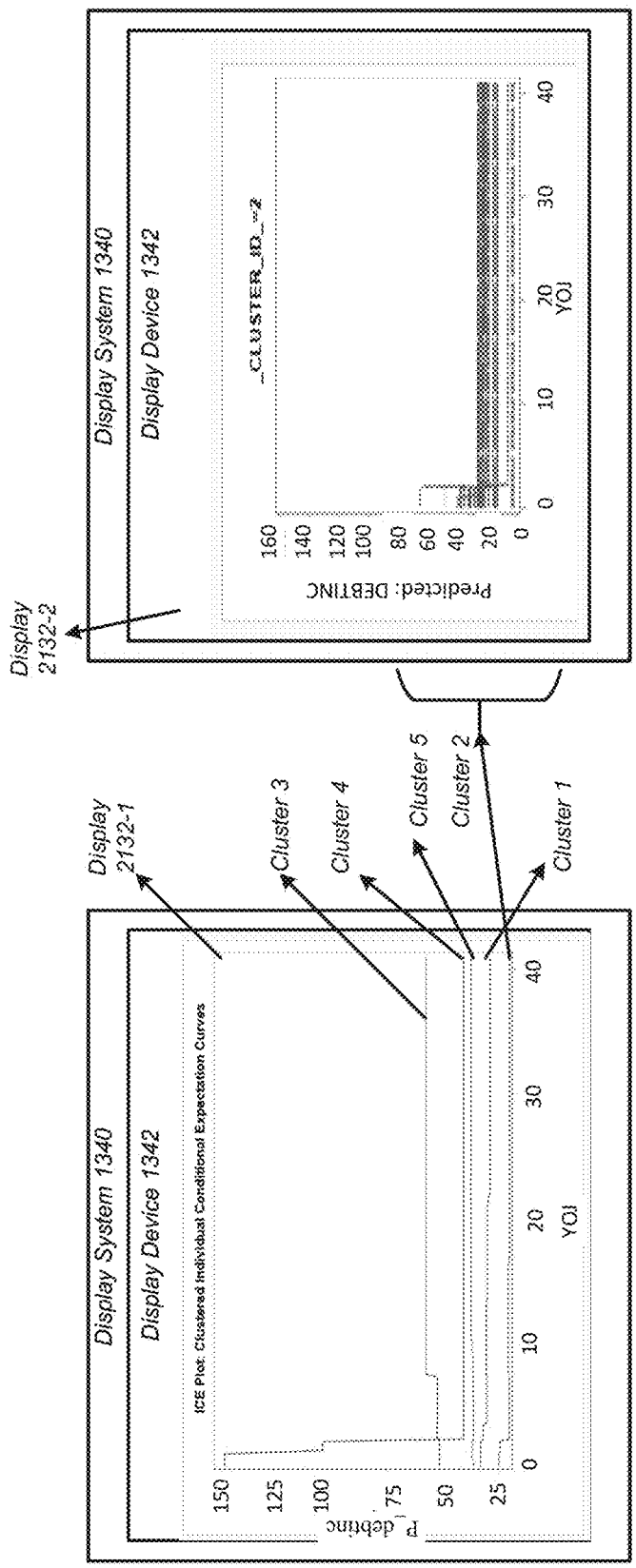
Figure 21C:
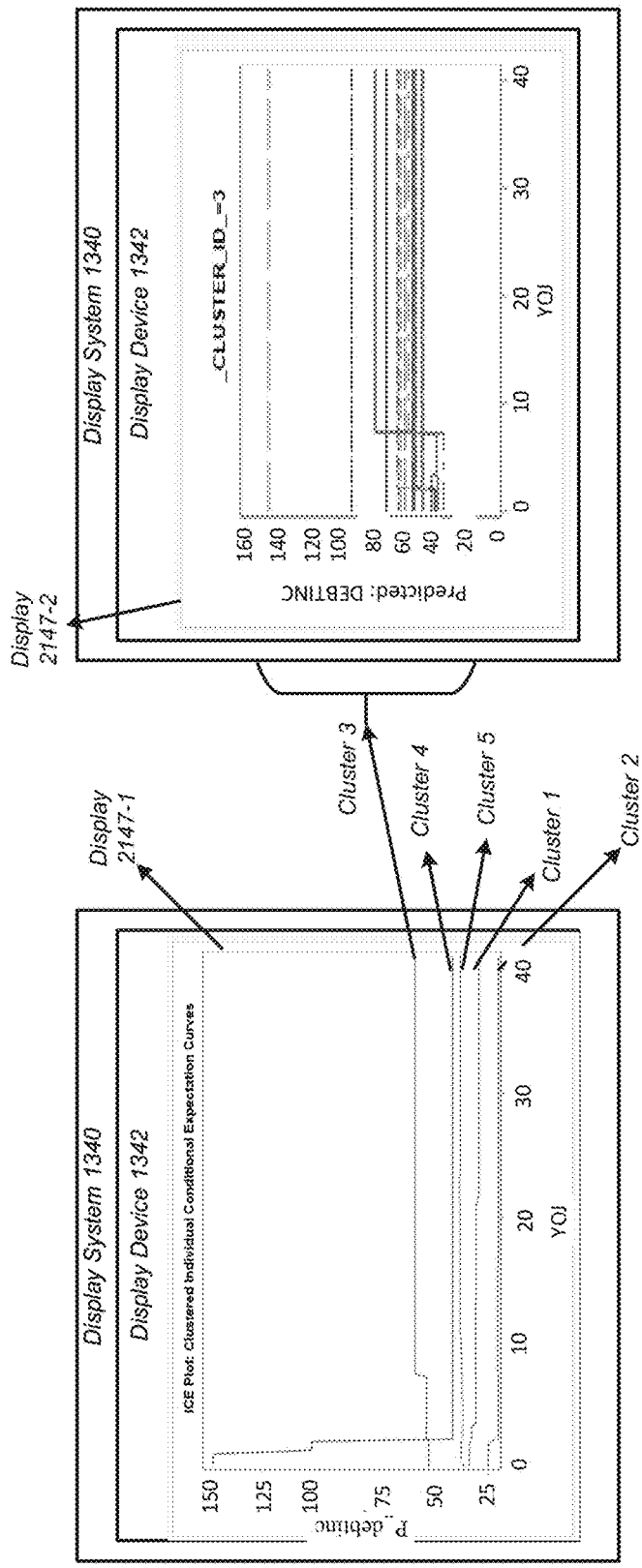
Figure 21D:
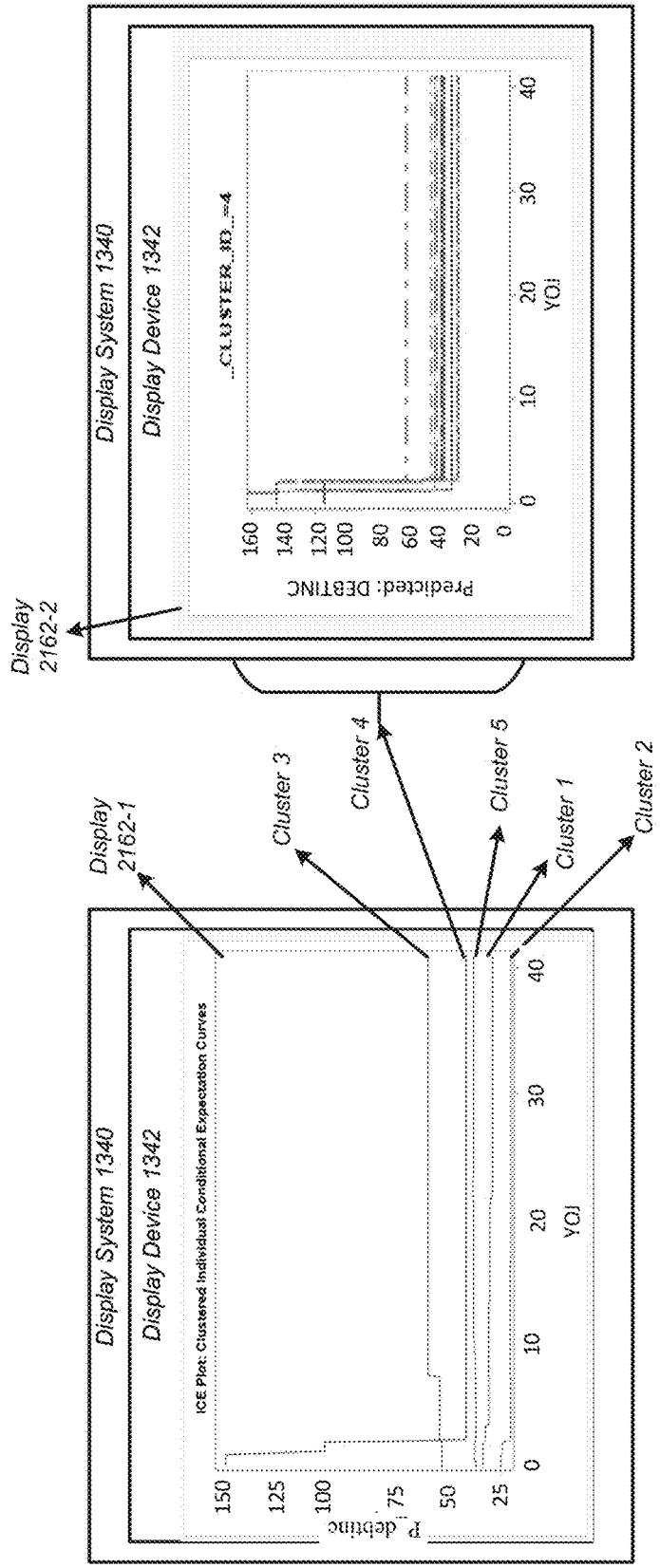
Figure 21E:
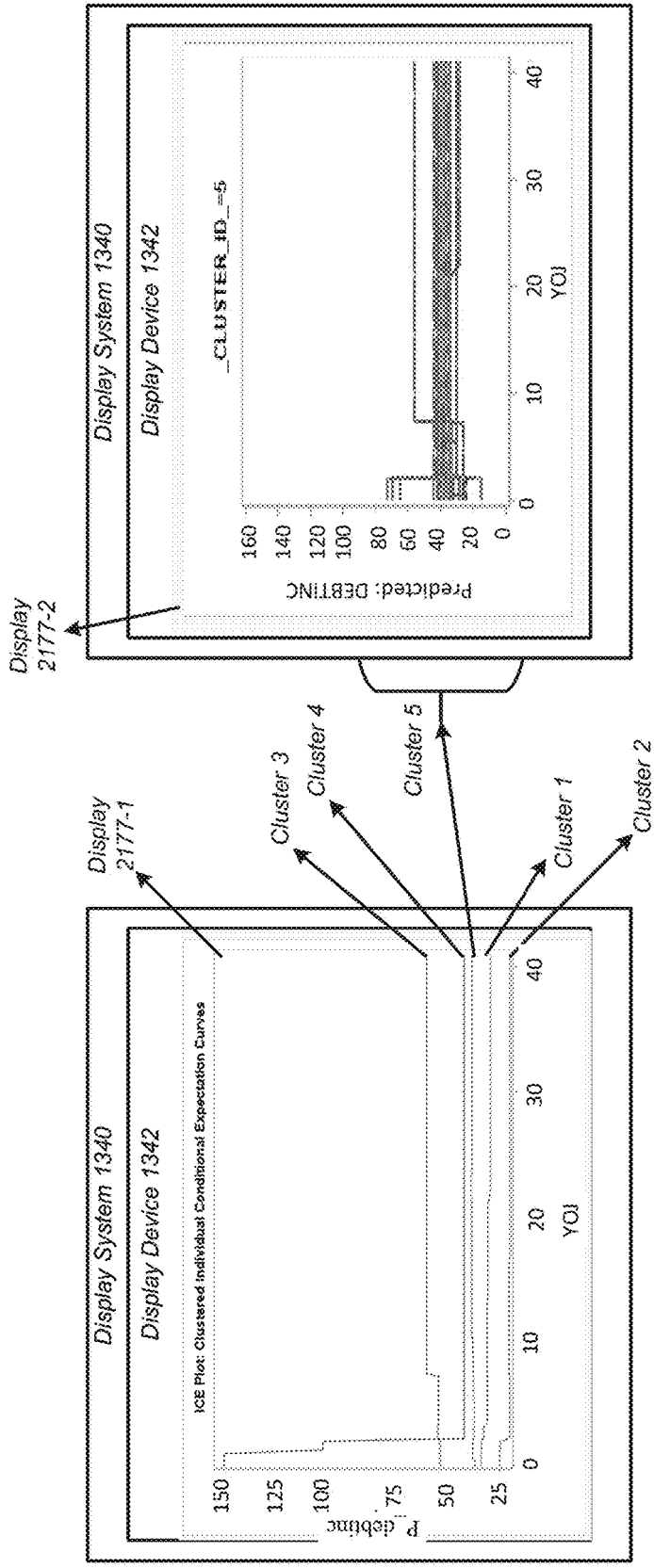

FIGS. 21A-21E illustrate segmented ICE plots 2115, 2130, 2145, 2160, and 2175. More specifically, each of the segmented ICE plots 2115, 2130, 2145, 2160, and 2175 illustrate plots with clustered curves (5) in the left-handed display device 1342 and individual curves represented by an indicated one of the clustered curves in the right-handed display 1342. More specifically, FIG. 21A illustrates 5 clustered curves presented on the left-hand display 2117-1 with cluster 1 selected. The right-hand display 2117-2 of FIG. 21A illustrates the individual curves that are represented by the cluster 1 curve. Similarly, the right-hand display 2132-2 of FIG. 21B illustrates the individual curves that are represented by the cluster 2 curve illustrated in display 2132-1, the right-hand display 2147-2 of FIG. 21C illustrates the individual curves that are represented by the cluster 3 curve illustrated in the display 2147-1, the right-hand display 2162-2 of FIG. 21D illustrates the individual curves that are represented by the cluster 4 curve illustrated in display 2162-1, and the right-hand display 2177-2 of FIG. 21E illustrates the individual curves that are represented by the cluster 5 curve illustrated in display 2177-1. As previously discussed, a user may select one of the segmented or clustered curves using an input device and a GUI that may be presented on the display device 1342. The plotting system 1310 may then generate and present the individual curves on the display device 1342 as found in each one of the right-hand displays 2117-2, 2132-2, 2147-2, 2162-2, and 2177-2 based on the selection. Embodiments are not limited in this manner.

Figure 22A:
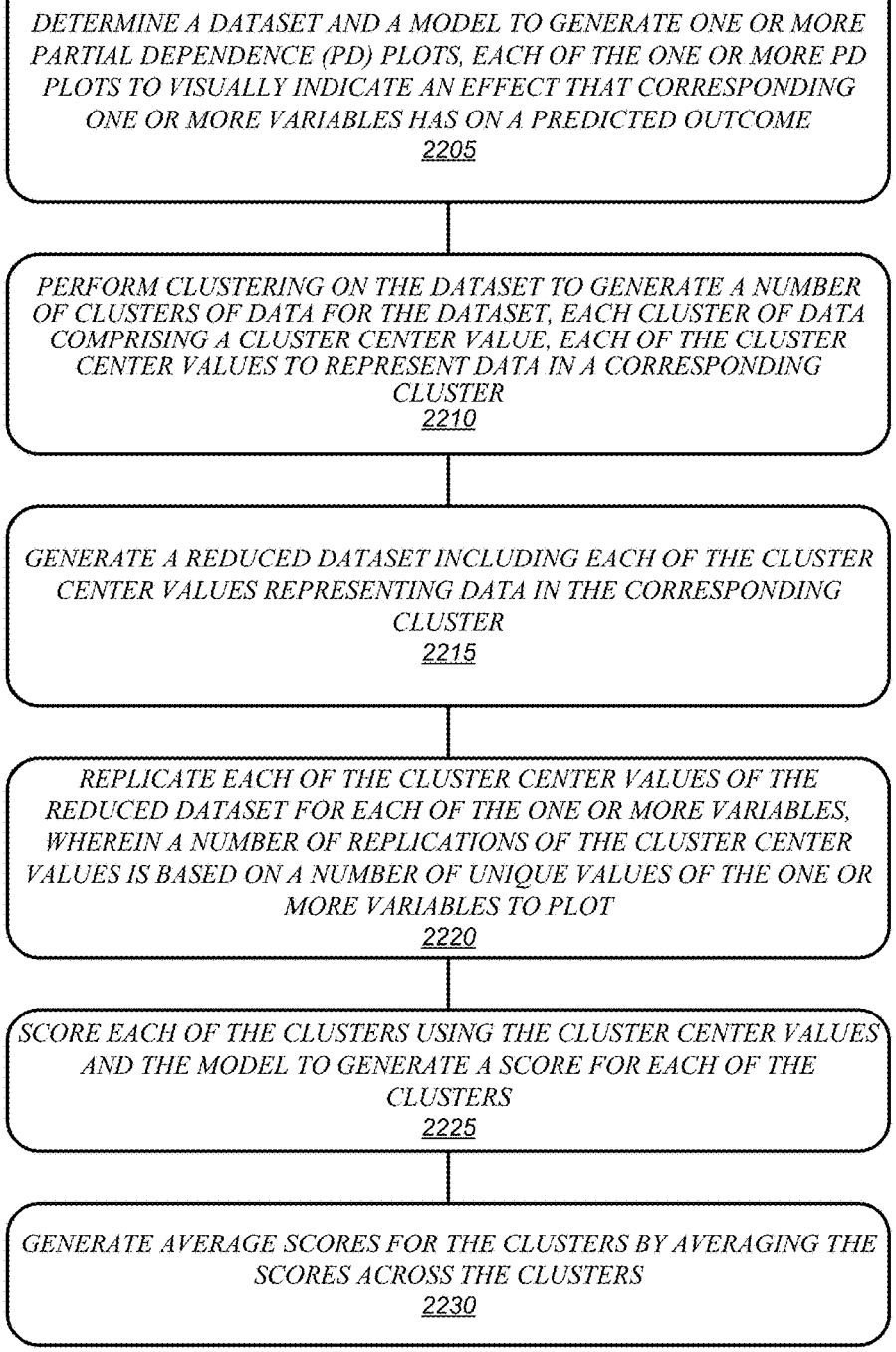
FIGS. 22A/22B illustrate an example of a logic flow.
Figure 22B:
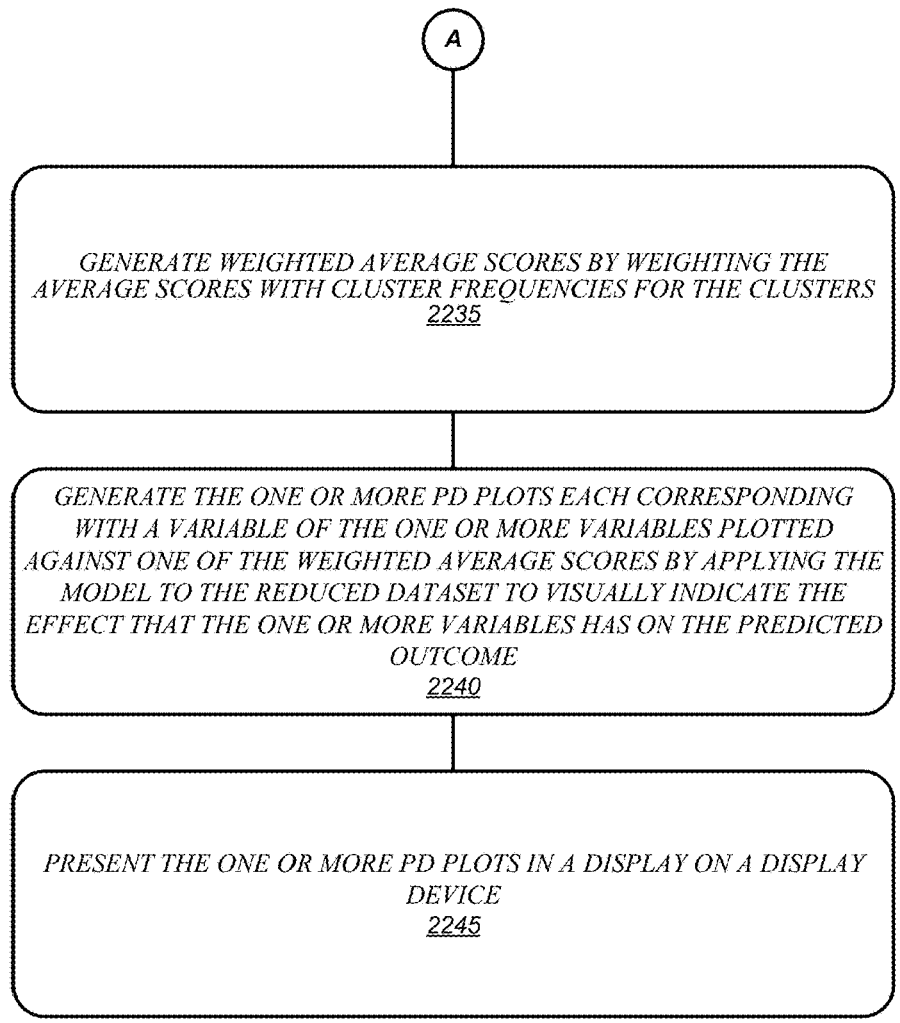

FIGS. 22A/22B illustrate an example of a logic flow 2200. The logic flow 2200 may be representative of some or all of the operations executed by one or more embodiments described herein. For example, the logic flow 2200 may illustrate operations performed by the plotting system 1310, as discussed in Figures FIGS. 13A-21E. In the illustrated embodiment shown in FIGS. 22A/22B, the logic flow 2200 includes determining a dataset and a model to generate one or more partial dependence (PD) plots, each of the one or more PD plots to visually indicate an effect that corresponding one or more variables has on a predicted outcome at block 2205. In embodiments, the dataset and the model may be determined based on information in a macro code that may be executed or run by the plotting system 1310. For example, the macro code may include an indication of a location of the data and a location of the score code for the model. In another example, a user may provide an indication of the dataset and the model via an input device, e.g., keyboard/mouse input. In embodiments, the dataset and model, which may also indicate score code or a score function, may be utilized by the plotting system 1310 to generate one or more plots. These plots can indicate an effect that corresponding variables have on a predicted outcome, e.g., allows a user to gain insight into what is generally considered a block box model. The variables and the predicted outcome(s) may also be indicated in the macro code along with other information, as previously discussed.

At block 2210, the logic flow 2200 includes performing clustering on the dataset to generate a number of clusters of data for the dataset, each cluster of data comprising a cluster center value, each of the cluster center values to represent data in a corresponding cluster. The clustering may be grouping operation and the type of clustering utilized may also be specified in the macro code and/or by a user of the plotting system 1310. In one example, the clustering may be k-prototype clustering applied to the dataset. Further, the number of clusters generated may also be specified macro code, provided by a user, and/or determined via utilization of the ABC method.

In embodiments, the logic flow 2200 includes generating a reduced dataset including each of the cluster center values representing data in the corresponding cluster at block 2215. Further and a block 2220, the logic flow 2200 includes replicating each of the cluster center values of the reduced dataset for each of the one or more variables, wherein a number of replications of the cluster center values equal a number of the one or more variables to plot. For example, if the number of variables is two, the cluster center values may be replicated two times in the reduced dataset. In another example, if the number of variables is five, the cluster center values may be replicated five times in the reduced dataset. Thus, each cluster center value may be in the dataset x number of times for x number of variables plotted.

The logic flow 2200 includes scoring each of the clusters using the cluster center values and the model to generate a score for each of the clusters at block 2225. In embodiments, the cluster center values may be scored by applying score function of the model and the scores may be they values, as previously discussed. Further and at block 2230, embodiments include generating average scores for the clusters by averaging the scores across the clusters. At block 2235, embodiment include generate weighted average scores by weighting the average scores with cluster frequencies for the clusters. In embodiments, the weighted average scores may be the weighted average ŷ values.

The logic flow 2200, at block 2230, includes generating the one or more PD plots each corresponding with a variable of the one or more variables plotted against one of the weighted average scores by applying the model to the reduced dataset to visually indicate the effect that the one or more variables has on the predicted outcome. At block 2235, the logic flow 2200 includes presenting the one or more PD plots in a display on a display device.

FIG. 23 illustrate an example of a logic flow 2300. The logic flow 2300 may be representative of some or all of the operations executed by one or more embodiments described herein. For example, the logic flow 2300 may illustrate operations performed by the plotting system 1310, as discussed in Figures FIGS. 13A-21E. In the illustrated embodiment shown in FIG. 23, the logic flow 2300 includes identifying a dataset and a model to generate Individual Conditional Expectation (ICE) plots, the dataset comprising observations and the ICE plots to visually indicate an effect that a variable has on a predicted outcome at block 2305. In embodiments, the dataset and the model may be determined based on information in macro code that may be executed or run by the plotting system 1310. For example, the macro code may include an indication of a location of the dataset and a location of the score code for the model. In another example, a user may provide an indication of the dataset and the model via an input device, e.g., keyboard/mouse input. In embodiments, the dataset and model (score code) may be utilized by the plotting system 1310 to generate the ICE plots. These plots can indicate an effect that the variable has on a predicted outcome.

At block 2310, the logic flow 2300 includes identify a range of values for the variable to compute individual curves for the observations. The range of values may be all possible values for the variable between a lower bound and an upper bound. The range of values may be positive and negative integers, fractional values, rational values, non-integer values, and so forth and may be dependent on the variable and dataset. In embodiments, the range of values may be specified in macro code, by a user of the system, determine the plotting system 1310, and so forth. Embodiments are not limited in this manner.

At block 2315 the logic flow 2300 includes computing individual curves for the observations of the dataset, wherein an individual curve is computed for each observation by varying the variable over the range of values for the observation using the model. Thus, for every observation in the dataset, a different individual curve will be generated, e.g., 1000 individual curves will be generated for a 1000 observations. The plotting system 1310 may compute each of the individual curves by determining data points for the individual curves based on varying the variable over the range of values for a particular observation.

The logic flow 2300 includes performing segmenting of the individual curves to generate a number of clusters of curves, each cluster of curves comprising a subset of the individual curves and each of the subsets of the individual curves represented by a respective proxy curve at block 2320. For example, the plotting system 1310 may perform k-prototype clustering to generate the clusters of curves. Moreover, the number of clusters to generate may be determined by applying the ABC method to the set of individual curves generated and based on a maximum number of curves permitted or specified in macro code.

At block 2325, the logic flow 2300 includes plotting each of the proxy curves to visually indicate the effect the variable has on the predicted outcome. Further and at block 2330, the logic flow includes presenting the ICE plots of the proxy curves in a display on a display device.

Embodiments discussed herein may also include the logic to generate the models and make predictions for a target variable. Other embodiments include a computer-implemented method, and/or at least one non-transitory computer-readable storage medium having instructions that when executed cause processing circuitry to perform the various operations discussed herein. These embodiments may provide technical advantages over previous systems by enabling a user of the system to interact with decision tree data structures to flag anomalies in real-time.

As discussed, some systems may use Hadoop®, an open-source framework for storing and analyzing big data in a distributed computing environment to generate models and probabilities of occurrence as discussed herein. Some systems may use cloud computing, which can enable ubiquitous, convenient, on-demand network access to a shared pool of configurable computing resources (e.g., networks, servers, storage, applications, and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

What is claimed is:

1. An apparatus, comprising:
  processing circuitry; and
  memory to store instructions that, when executed by the processing circuitry, cause the processing circuitry to:
    receive an indication to generate Individual Conditional Expectation (ICE) plots, the indication received based on an interaction with a graphical user interface (GUI);
    identify a dataset and a model to generate the ICE plots, the dataset comprising observations and the ICE plots to visually indicate an effect that a variable has on a predicted outcome;
    identify a range of values for the variable to compute individual curves for the observations;
    compute individual curves for the observations of the dataset, wherein an individual curve is computed for each observation by varying the variable over the range of values for the observation using the model;
    perform segmenting of the individual curves to generate a number of clusters of curves, each cluster of curves comprising a subset of the individual curves and each of the subsets of the individual curves represented by a respective proxy curve;

plot each of the proxy curves to visually indicate the effect the variable has on the predicted outcome;

present the ICE plots of the proxy curves in the GUI of a display on a display device, and each respective proxy curve is selectable to drill down on one of the subsets of individual curves within the cluster of curves;

receive a selection of a subset of individual curves via another interaction with the GUI; and present the subset of individual curves selected in the GUI.

2. The apparatus of claim 1, the processing circuitry to:
perform k-prototype clustering to cluster the curves; and
determine cluster center curves for the clusters of curves, wherein each cluster center curve is the respective proxy curve for one of the cluster of curves.

3. The apparatus of claim 1, the processing circuitry to:
receive an indication of a selection of one of the respective proxy curves, the selection made via a user input device;
determine a subset of individual curves associated with the selected proxy curve;
plot each curve of the subset of the individual curves associated with the selected proxy curve; and
present the plots of the curves in the display on the display device.

4. The apparatus of claim 1, the processing circuitry to detect an input, the input to initialize processing of macro code to generate the proxy curves to plot, the macro code to provide one or more of an indication of the dataset, an indication of the variable, an indication of a range of values for the variable, an indication of model score code for the model, an indication of the predicted outcome, an indication of a maximum number of cluster of curves, and an indication whether to sample or cluster observations of the dataset.

5. The apparatus of claim 1, the processing circuitry to:
determine a potential number of clusters of curves to generate using an Aligned Box Criterion (ABC) method;
determine a maximum number of cluster of curves specified in macro code; and
generate whichever is lesser, the potential number of clusters of curves or the maximum number of cluster of curves.

6. The apparatus of claim 1, the processing circuitry to determine whether to perform sampling or clustering on the dataset prior to computing the individual curves based on a setting in macro code.

7. The apparatus of claim 1, the processing circuitry to perform sampling on the dataset to a reduced dataset comprising a random sample of the observations, and wherein the reduced dataset is used to compute the individual curves.

8. The apparatus of claim 1, the processing circuitry to:
perform clustering on the dataset to generate a number of clusters of observations for the dataset, each cluster of observations comprising a cluster center value, each of the cluster center values to represent observations in a corresponding cluster; and
generate a reduced dataset including each of the cluster center values representing observations in the corresponding cluster, the reduced data set used to compute the individual curves.

9. The apparatus of claim 1, comprising:
an input device coupled with the memory and the processing circuitry;
the display device coupled with the input device, the memory, and the processing circuitry, the display device operable to present the plots; and
the processing circuitry to receive, by an input device, one or more inputs to manipulate at least one of the one or more ICE plots, and in response to receive the one or more inputs, performing a manipulation including one or more of zooming in a section of a plot, zooming out on a section of a plot, rotating one or more plots, highlighting a plot, drawing on a plot, and selecting a plot.

10. A computer-implemented method, comprising:
receiving an indication to generate Individual Conditional Expectation (ICE) plots, the indication received based on an interaction with a graphical user interface (GUI);
identifying a dataset and a model to generate the ICE plots, the dataset comprising observations and the ICE plots to visually indicate an effect that a variable has on a predicted outcome;
identifying a range of values for the variable to compute individual curves for the observations;
computing individual curves for the observations of the dataset, wherein an individual curve is computed for each observation by varying the variable over the range of values for the observation using the model;
performing segmenting of the individual curves to generate a number of clusters of curves, each cluster of curves comprising a subset of the individual curves and each of the subsets of the individual curves represented by a respective proxy curve;
plotting each of the proxy curves to visually indicate the effect the variable has on the predicted outcome;
presenting the ICE plots of the proxy curves in the GUI of a display on a display device, and each respective proxy curve is selectable to drill down on one of the subsets of individual curves within the cluster of curves;
receiving a selection of a subset of individual curves via another interaction with the GUI; and
presenting the subset of individual curves selected in the GUI.

11. The computer-implemented method of claim 10, comprising:
performing k-prototype clustering to cluster the curves; and
determining cluster center curves for the clusters of curves, wherein each cluster center curve is the respective proxy curve for one of the cluster of curves.

12. The computer-implemented method of claim 10, comprising:
receiving an indication of a selection of one of the respective proxy curves, the selection made via a user input device;
determining a subset of individual curves associated with the selected proxy curve;
plotting each curve of the subset of the individual curves associated with the selected proxy curve; and
presenting the plots of the curves in the display on the display device.

13. The computer-implemented method of claim 10, comprising detecting an input, the input to initialize processing of macro code to generate the proxy curves to plot, the macro code to provide one or more of an indication of the dataset, an indication of the variable, an indication of a range of values for the variable, an indication of model score code for the model, an indication of the predicted outcome, an indication of a maximum number of cluster of curves, and an indication whether to sample or cluster observations of the dataset.

14. The computer-implemented method of claim 10, comprising:
   determining a potential number of clusters of curves to generate using an Aligned Box Criterion (ABC) method;
   determining a maximum number of cluster of curves specified in macro code; and
   generating whichever is lesser, the potential number of clusters of curves or the maximum number of cluster of curves.

15. The computer-implemented method of claim 10, comprising determining whether to perform sampling or clustering on the dataset prior to computing the individual curves based on a setting in macro code.

16. The computer-implemented method of claim 10, comprising performing sampling on the dataset to a reduced dataset comprising a random sample of the observations, and wherein the reduced dataset is used to compute the individual curves.

17. The computer-implemented method of claim 10, comprising:
   performing clustering on the dataset to generate a number of clusters of observations for the dataset, each cluster of observations comprising a cluster center value, each of the cluster center values to represent observations in a corresponding cluster; and
   generating a reduced dataset including each of the cluster center values representing observations in the corresponding cluster, the reduced data set used to compute the individual curves.

18. The computer-implemented method of claim 10, comprising receiving, by an input device, one or more inputs to manipulate at least one of the one or more ICE plots, and in response to receive the one or more inputs performing a manipulation including one or more of zooming in a section of a plot, zooming out on a section of a plot, rotating one or more plots, highlighting a plot, drawing on a plot, and selecting a plot.

19. At least one non-transitory computer-readable storage medium comprising instructions that when executed cause processing circuitry to:
   receive an indication to generate Individual Conditional Expectation (ICE) plots, the indication received based on an interaction with a graphical user interface (GUI);
   identify a dataset and a model to generate the ICE plots, the dataset comprising observations and the ICE plots to visually indicate an effect that a variable has on a predicted outcome;
   identify a range of values for the variable to compute individual curves for the observations;
   compute individual curves for the observations of the dataset, wherein an individual curve is computed for each observation by varying the variable over the range of values for the observation using the model;
   perform segmenting of the individual curves to generate a number of clusters of curves, each cluster of curves comprising a subset of the individual curves and each of the subsets of the individual curves represented by a respective proxy curve;
   plot each of the proxy curves to visually indicate the effect the variable has on the predicted outcome;
   present the ICE plots of the proxy curves in the GUI of a display on a display device, and each respective proxy curve is selectable to drill down on one of the subsets of individual curves within the cluster of curves;
   receive a selection of a subset of individual curves via another interaction with the GUI; and
   present the subset of individual curves selected in the GUI.

20. The at least one non-transitory computer-readable storage medium of claim 19 comprising instructions that when executed cause processing circuitry to:
   perform k-prototype clustering to cluster the curves; and
   determine cluster center curves for the clusters of curves, wherein each cluster center curve is the respective proxy curve for one of the cluster of curves.

21. The at least one non-transitory computer-readable storage medium of claim 19 comprising instructions that when executed cause processing circuitry to:
   receive an indication of a selection of one of the respective proxy curves, the selection made via a user input device;
   determine a subset of individual curves associated with the selected proxy curve;
   plot each curve of the subset of the individual curves associated with the selected proxy curve; and
   present the plots of the curves in the display on the display device.

22. The at least one non-transitory computer-readable storage medium of claim 19 comprising instructions that when executed cause processing circuitry to detect an input, the input to initialize processing of macro code to generate the proxy curves to plot, the macro code to provide one or more of an indication of the dataset, an indication of the variable, an indication of a range of values for the variable, an indication of model score code for the model, an indication of the predicted outcome, an indication of a maximum number of cluster of curves, and an indication whether to sample or cluster observations of the dataset.

23. The at least one non-transitory computer-readable storage medium of claim 19 comprising instructions that when executed cause processing circuitry to:
   determine a potential number of clusters of curves to generate using an Aligned Box Criterion (ABC) method;
   determine a maximum number of cluster of curves specified in macro code; and
   generate whichever is lesser, the potential number of clusters of curves or the maximum number of cluster of curves.

24. The at least one non-transitory computer-readable storage medium of claim 19 comprising instructions that when executed cause processing circuitry to determine whether to perform sampling or clustering on the dataset prior to computing the individual curves based on a setting in macro code.

25. The at least one non-transitory computer-readable storage medium of claim 19 comprising instructions that when executed cause processing circuitry to perform sampling on the dataset to a reduced dataset comprising a random sample of the observations, and wherein the reduced dataset is used to compute the individual curves.

26. The at least one non-transitory computer-readable storage medium of claim 19 comprising instructions that when executed cause processing circuitry to:
   perform clustering on the dataset to generate a number of clusters of observations for the dataset, each cluster of observations comprising a cluster center value, each of the cluster center values to represent observations in a corresponding cluster; and generate a reduced dataset including each of the cluster center values representing observations in the corresponding cluster, the reduced data set used to compute the individual curves.

27. The at least one non-transitory computer-readable storage medium of claim 19 comprising instructions that when executed cause processing circuitry to:

receive, by an input device, one or more inputs to manipulate at least one of the one or more ICE plots, and in response to receiving the one or more inputs, perform a manipulation including one or more of zooming in a section of a plot, zooming out on a section of a plot, rotating one or more plots, highlighting a plot, drawing on a plot, and selecting a plot.

* * * * *